(12) United States Patent
Shiro et al.

(10) Patent No.: US 11,418,628 B2
(45) Date of Patent: Aug. 16, 2022

(54) COMMUNICATION TERMINAL, COMMUNICATION SYSTEM, AND COMMUNICATION METHOD

(71) Applicants: Hideki Shiro, Kanagawa (JP); Shigeru Nakamura, Kanagawa (JP); Yuichi Kawasaki, Kanagawa (JP); Hiroshi Hinohara, Kanagawa (JP); Takeshi Homma, Kanagawa (JP)

(72) Inventors: Hideki Shiro, Kanagawa (JP); Shigeru Nakamura, Kanagawa (JP); Yuichi Kawasaki, Kanagawa (JP); Hiroshi Hinohara, Kanagawa (JP); Takeshi Homma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/141,236

(22) Filed: Jan. 5, 2021

(65) Prior Publication Data
US 2021/0274019 A1    Sep. 2, 2021

(30) Foreign Application Priority Data
Mar. 2, 2020   (JP) .............................. JP2020-035268

(51) Int. Cl.
*H04L 67/00*   (2022.01)
*H04L 67/75*   (2022.01)
(Continued)

(52) U.S. Cl.
CPC ............ *H04L 67/75* (2022.05); *G06F 3/1454* (2013.01); *G06T 11/60* (2013.01); *H04L 67/1097* (2013.01); *G06T 2200/16* (2013.01)

(58) Field of Classification Search
None
See application file for complete search history.

(56) References Cited

U.S. PATENT DOCUMENTS

2013/0038676 A1* 2/2013 Tanaka ................. G06T 1/20
                                                                 348/14.08
2015/0309765 A1* 10/2015 Nagahara ............... H04N 7/15
                                                                 345/2.2
(Continued)

OTHER PUBLICATIONS

U.S. Appl. No. 16/889,817, filed Jun. 2, 2020, Takeshi Homma, et al.

(Continued)

*Primary Examiner* — Martin Mushambo
(74) *Attorney, Agent, or Firm* — Xsensus LLP

(57) ABSTRACT

A communication terminal shares data with another communication terminal. The communication terminal includes circuitry. The circuitry receives, from a communication management apparatus that manages the data shared with the another communication terminal, storage location information representing a storage location of background image data transmitted from the another communication terminal, and transmits a download request to an image storing apparatus corresponding to the storage location to request download of the background image data. The circuitry further starts downloading the background image data from the image storing apparatus and receives, from the communication management apparatus, stroke data of a stroke image rendered on the another communication terminal.

10 Claims, 24 Drawing Sheets

(51) Int. Cl.
    *G06F 3/14*           (2006.01)
    *G06T 11/60*         (2006.01)
    *H04L 67/1097*    (2022.01)

(56) References Cited

U.S. PATENT DOCUMENTS

| | | |
|---|---|---|
| 2018/0095711 A1* | 4/2018 | Kanda .................. H04L 65/403 |
| 2020/0177742 A1 | 6/2020 | Homma et al. |
| 2020/0278823 A1 | 9/2020 | Kawasaki et al. |
| 2020/0296145 A1 | 9/2020 | Horiuchi et al. |
| 2020/0296146 A1 | 9/2020 | Hinohara et al. |

OTHER PUBLICATIONS

U.S. Appl. No. 16/935,211, filed Jul. 22, 2020, Yuichi Kawasaki, et al.
U.S. Appl. No. 16/989,889, filed Aug. 11, 2020, Hiroshi Hinohara, et al.
U.S. Appl. No. 17/019,362, filed Sep. 14, 2020, Daiki Nakamura, et al.
U.S. Appl. No. 17/030,399, filed Sep. 24, 2020, Kazunobu Takahashi, et al.
U.S. Appl. No. 17/068,851, filed Oct. 13, 2020, Kota Nagaoka, et al.

\* cited by examiner

FIG. 6A
FIG. 6 | FIG. 6A
        | FIG. 6B
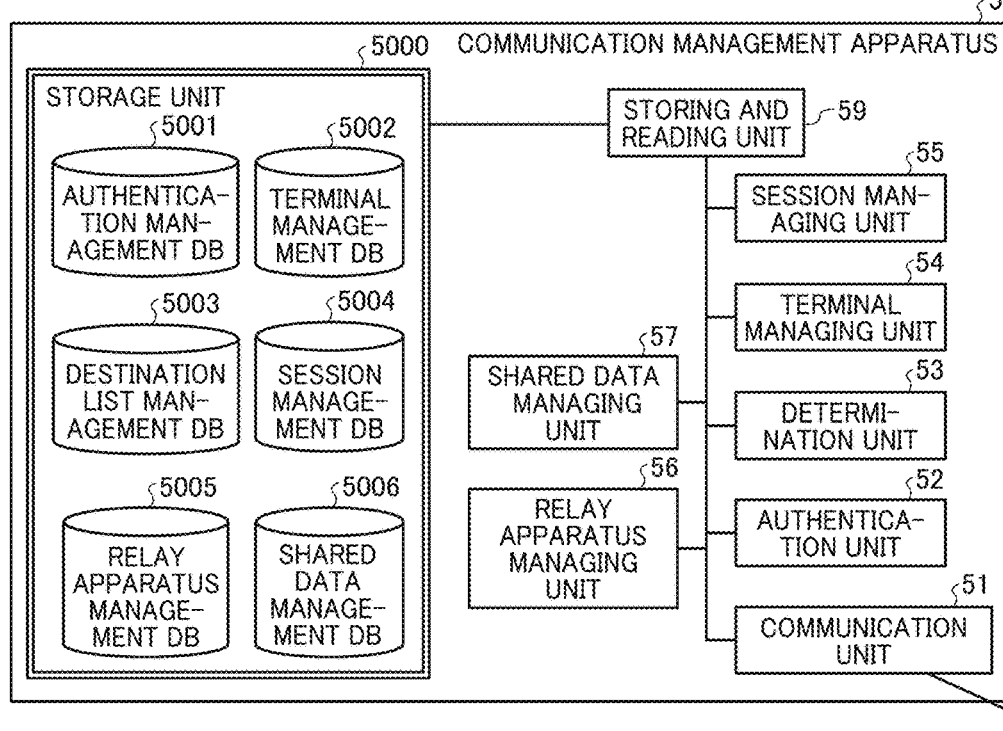
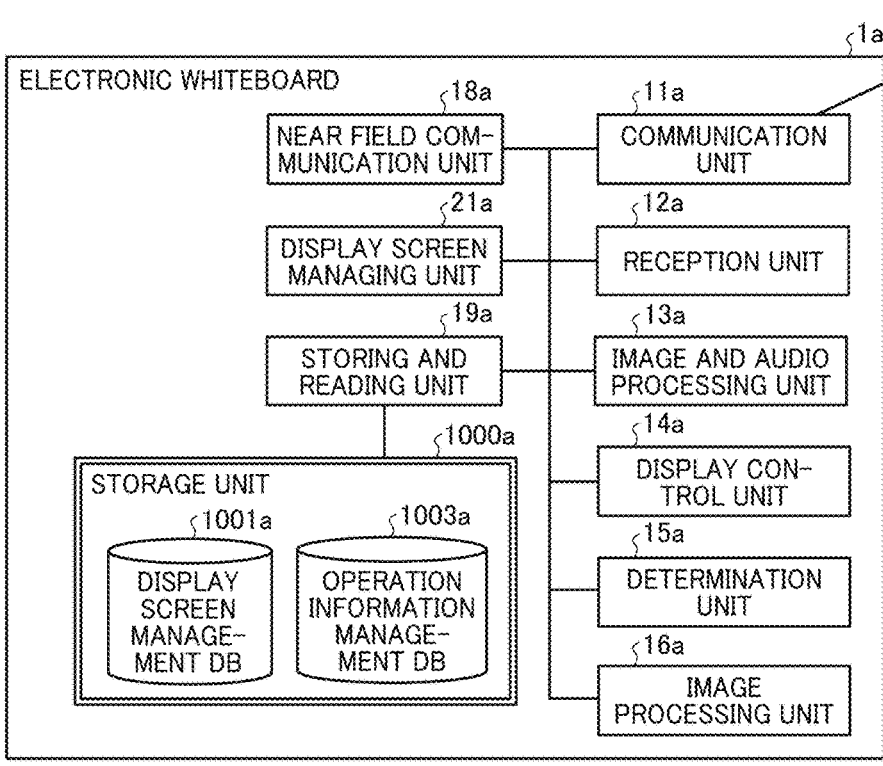

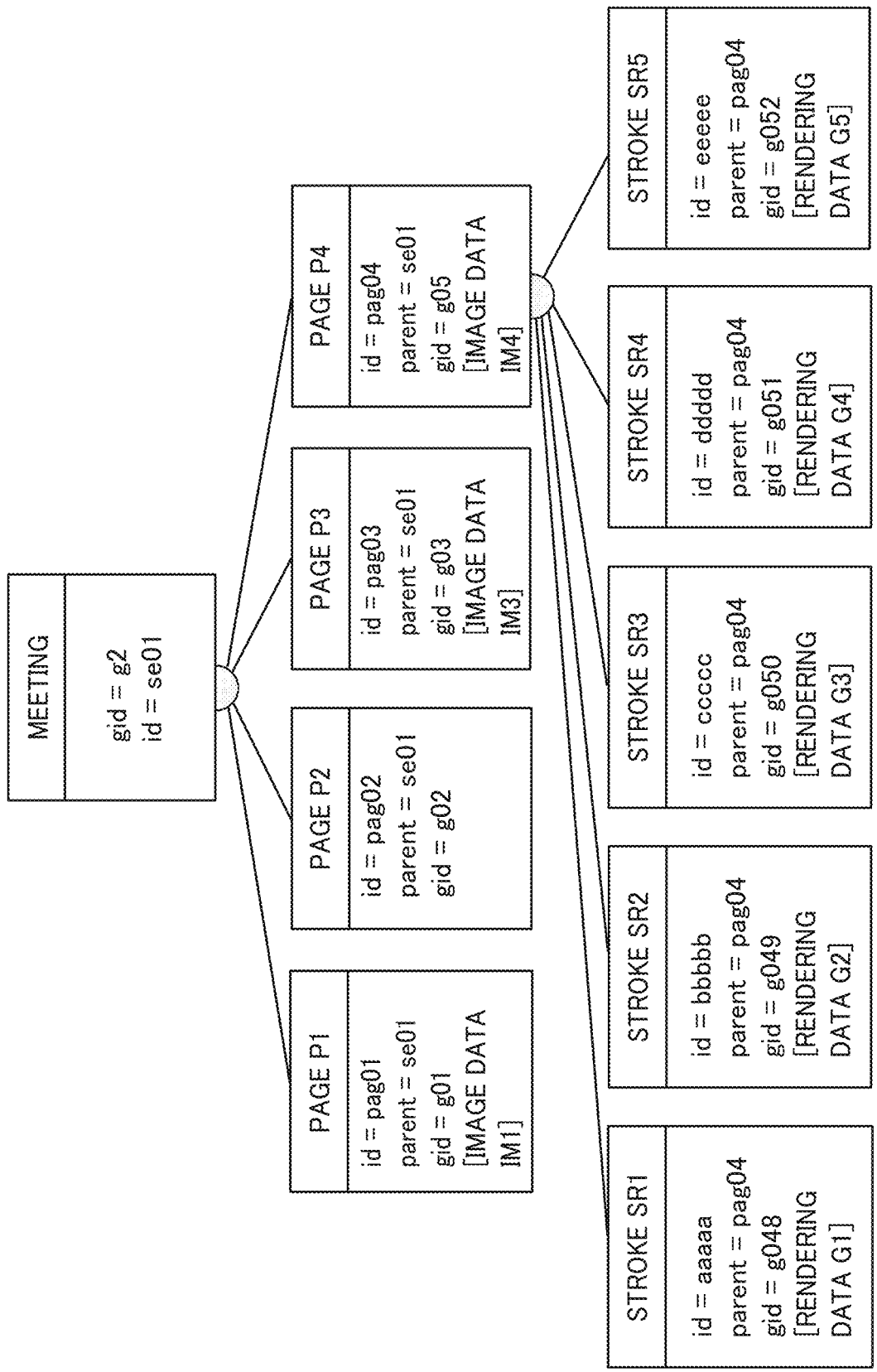

FIG. 8

Id : "mnojk"
DistId : "pag01"
Operation Type : "Add"
Data Type : "Stroke"
Data : "(2,2), (2,4), (3,6), (2,9)"

FIG. 9

| TERMINAL ID | PASSWORD |
|---|---|
| 01aa | aaaa |
| 01ba | baba |
| 01ca | caca |
| ... | ... |

FIG. 10

| TERMINAL ID | DESTINATION NAME | OPERATION STATE | RECEPTION TIME | TERMINAL IP ADDRESS |
|---|---|---|---|---|
| 01aa | TERMINAL AA, TOKYO BRANCH, JAPAN | ON-LINE (COMMUNICATION AVAILABLE) | 2019.2.10.13:40 | 1.2.1.3 |
| 01ab | MR. AB, TOKYO BRANCH, JAPAN | ON-LINE (COMMUNICATING) | 2019.2.09.12:00 | 1.2.1.4 |
| 01ac | MS. AC, TOKYO BRANCH, JAPAN | OFF-LINE | 2019.2.09.12:30 | 1.2.1.5 |
| ... | ... | ... | ... | ... |
| 01ba | TERMINAL BA, BEIJING BRANCH, CHINA | ON-LINE (COMMUNICATION AVAILABLE) | 2019.2.10.13:45 | 1.2.2.3 |
| 01bb | MR. BB, BEIJING BRANCH, CHINA | ON-LINE (COMMUNICATION TEMPORARILY INTERRUPTED) | 2019.2.10.13:50 | 1.2.2.4 |
| ... | ... | ... | ... | ... |
| 01ca | TERMINAL CA, WASHINGTON D.C. BRANCH, US | OFF-LINE | 2019.2.10.12:45 | 1.3.1.3 |
| 01cb | MS. CB, WASHINGTON D.C. BRANCH, US | ON-LINE (COMMUNICATING) | 2019.2.10.13:55 | 1.3.1.4 |
| ... | ... | ... | ... | ... |
| 01da | TERMINAL DA, BERLIN BRANCH, EUROPE | ON-LINE (COMMUNICATING) | 2019.2.08.12:45 | 1.3.2.3 |
| 01db | MR. DB, BERLIN BRANCH, EUROPE | ON-LINE (COMMUNICATION AVAILABLE) | 2019.2.10.12:45 | 1.3.2.4 |
| ... | ... | ... | ... | ... |

FIG. 11

| TERMINAL ID OF STARTING TERMINAL | TERMINAL IDS OF DESTINATION CANDIDATE TERMINALS |
|---|---|
| 01aa | 01ab,···,01ba,01bb,···,01ca,01cb,01da,01db,··· |
| 01ab | 01aa,01ca,01cb,01da |
| ... | ... |
| 01ba | 01aa,01ab,01ca,01cb,01da,01db |
| ... | ... |
| 01ca | 01aa,01ab,01ba,···,01cb,···,01db |

FIG. 12

| SESSION ID | RELAY APPARATUS ID | STARTING TERMINAL ID | DESTINATION TERMINAL ID | DELAY TIME (ms) | DELAY INFORMATION RECEPTION TIME |
|---|---|---|---|---|---|
| se01 | 111a | 01aa | 01db | 200 | 2019.2.10.13:41 |
| se02 | 111a | 01ba | 01cb | 50 | 2019.2.10.12:01 |
| ... | | | | | ... |

FIG. 13

| RELAY APPARATUS ID | OPERATION STATE | RECEPTION TIME | RELAY APPARATUS IP ADDRESS | MAXIMUM DATA TRANSMISSION SPEED (Mbps) |
|---|---|---|---|---|
| 111a | ON-LINE | 2020.2.10.13:00 | 1.2.1.2 | 100 |
| 111b | OFF-LINE | 2020.2.10.13:10 | 1.2.2.2 | 1000 |
| 111c | ON-LINE | 2020.2.10.13:20 | 1.3.1.2 | 100 |
| 111d | ON-LINE | 2020.2.10.13:30 | 1.3.2.2 | 10 |

FIG. 14

SESSION ID ; se02

SESSION ID ; se01

| ID | SEQUENCE NUMBER | BODY | PARENT |
|---|---|---|---|
| se01 | 1 | children : pag01, pag02, pag03, pag04<br>current page : pag04 | - |
| pag01 | 2 | URL OF IMAGE DATA; http://xxx.jpeg | se01 |
| mnojk | 3 | COLOR (RGBA) : (0,0,0,0)<br>WIDTH (px) : 10px<br>VERTICES (x,y) : (0,0), (10,0), (20,1), (30,10) | pag01 |
| bmqpv | 4 | COLOR (RGBA) : (128,0,0,0)<br>WIDTH (px) : 14px<br>VERTICES (x,y) : (10,50), (15,55), (16,40) | pag01 |
| ... | ... | ... | ... |
| pag02 | 12 | - | se01 |
| rstuv | 13 | COLOR (RGBA) : (255,255,255,0)<br>WIDTH (px) : 10px<br>VERTICES (x,y) : (100,20), (110,30), (11,40) | pag02 |
| ... | ... | ... | ... |
| pag04 | 50 | URL OF IMAGE DATA; http://yyy.jpeg | se01 |
| aaaaa | 51 | COLOR (RGBA) : (255,255,128,0)<br>WIDTH (px) : 13px<br>VERTICES (x,y) : (57,60), (123,43) | pag04 |
| ... | ... | ... | ... |

FIG. 16

| STATE | TERMINAL ID | DESTINATION NAME |
|---|---|---|
| 📞 | 01ab | MR. AB, TOKYO BRANCH, JAPAN |
| 📞 | 01ba | TERMINAL BA, BEIJING BRANCH, CHINA |
| ⋮ | ⋮ | ⋮ |
| 📞 | 01db | MR. DB, BERLIN BRANCH, EUROPE |
| ⋮ | ⋮ | ⋮ |

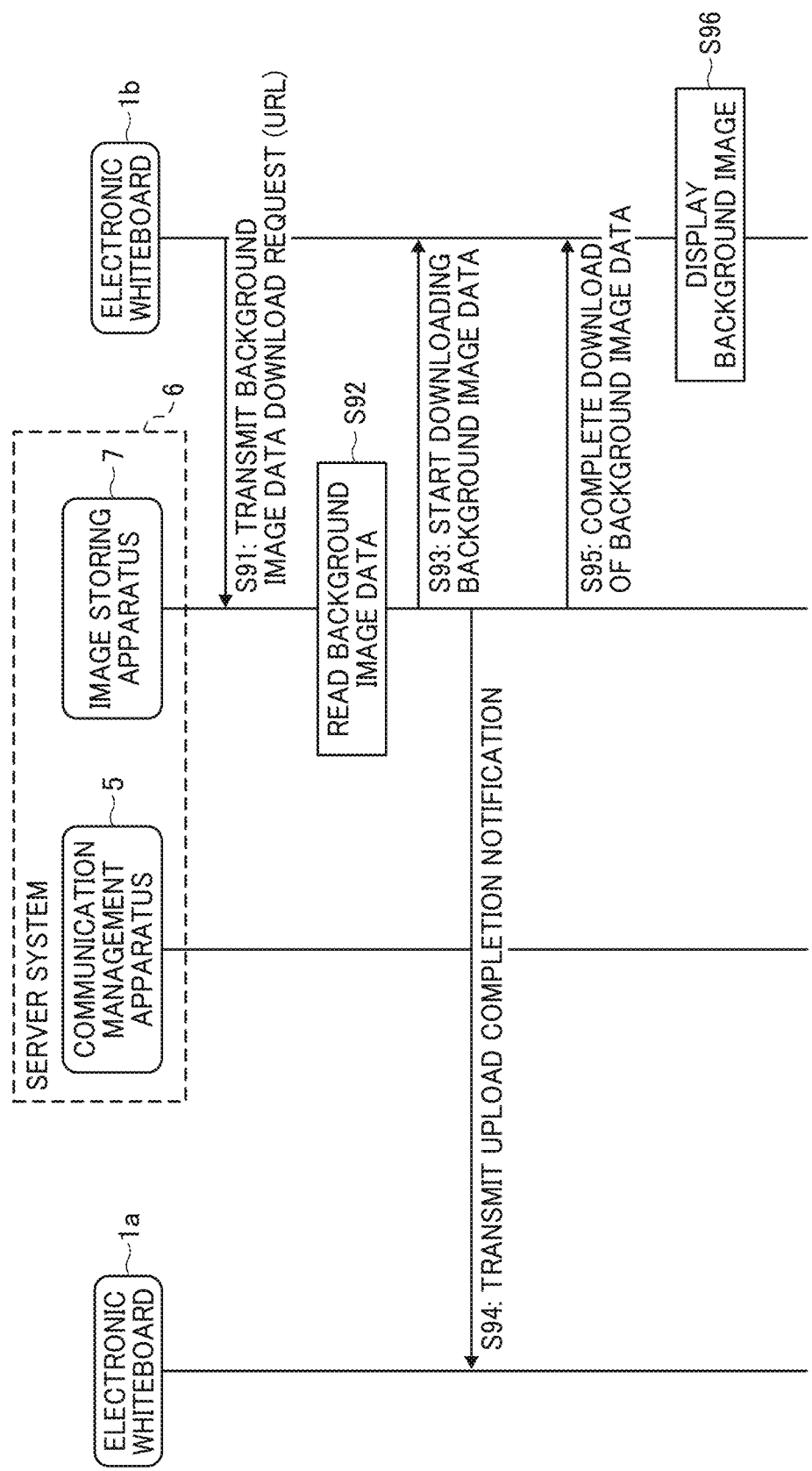

COMMUNICATION TERMINAL, COMMUNICATION SYSTEM, AND COMMUNICATION METHOD

CROSS-REFERENCE TO RELATED APPLICATION

This patent application is based on and claims priority pursuant to 35 U.S.C. § 119(a) to Japanese Patent Application No. 2020-035268 filed on Mar. 2, 2020 in the Japan Patent Office, the entire disclosure of which is hereby incorporated by reference herein.

BACKGROUND

Technical Field

The present invention relates to a communication terminal, a communication system, and a communication method.

Description of the Related Art

There is a widely used communication system that enables communication between remote sites via a communication network such as the Internet. An example of such a communication system is a conference system that enables a remote conference. In a typical conference system, image data being held or displayed by a communication terminal used by one of two parties participating in the remote conference is transmitted, via the communication network, to a communication terminal used by the other party, thereby enabling the two parties to share the image data. With this system, the conference between the remote sites is held in a setting close to that of a conference held in the same physical space.

Further, in conferences or meetings held in organizations such as companies, educational institutions, and governmental institutions, a communication terminal such as an electronic whiteboard has been used which displays an image on a display so that a user renders a stroke image of a letter, character, number, or figure, for example, on the image. The stroke image is rendered based on stroke data including coordinate data. The communication terminal generates the stroke data by electronically converting content rendered on the display by a user moving an electronic pen or a finger over the display while keeping the electronic pen or the finger in contact with the display. When the stroke image is rendered on one communication terminal (a first communication terminal), stroke data for reproducing the stroke image is transmitted to the other communication terminal (a second communication terminal) via the communication network. Thereby, the other communication terminal displays the same stroke image.

The stroke data for reproducing the stroke image and the image data of a material being displayed or stored by the first communication terminal are thus transmitted to the second communication terminal via the communication network. Thereby, the second communication terminal is able to display the stroke image as well as a background image such as the image of a material or the image of a background, for example.

In recent years, however, the data of the background image such as the image of a material has been substantially increased in size owing to sophistication of application programs. For example, the data size of the background image data is substantially greater than that of the stroke data for reproducing the stroke image. Consequently, the background image data and the stroke data reach the second communication terminal at different times. That is, the stroke data may reach the second communication terminal before the background image data does. In this case, the second communication terminal displays the background image after the process of displaying the stroke image progresses to some extent. It is therefore after the display of the stroke image progresses to some extent that the user of the second communication terminal realizes the existence of the background image. Consequently, the user of the second communication terminal has difficulty in smooth communication with the user of the first communication terminal.

SUMMARY

In one embodiment of this invention, there is provided an improved communication terminal that shares data with another communication terminal. The communication terminal includes, for example, circuitry. The circuitry receives, from a communication management apparatus that manages the data shared with the another communication terminal, storage location information representing a storage location of background image data transmitted from the another communication terminal, and transmits a download request to an image storing apparatus corresponding to the storage location to request download of the background image data. The circuitry further starts downloading the background image data from the image storing apparatus and receives, from the communication management apparatus, stroke data of a stroke image rendered on the another communication terminal.

In one embodiment of this invention, there is provided an improved communication system that includes, for example, a first communication terminal and a second communication terminal that shares data with the first communication terminal. The first communication terminal includes first circuitry. The first circuitry transmits, to a communication management apparatus that manages the data shared with the second communication terminal, storage location information representing a storage location of background image data. The second communication terminal includes second circuitry. The second circuitry receives the storage location information from the communication management apparatus, and transmits a download request to an image storing apparatus corresponding to the storage location to request download of the background image data. The second circuitry further starts downloading the background image data from the image storing apparatus and receives, from the communication management apparatus, stroke data of a stroke image rendered on the first communication terminal.

In one embodiment of this invention, there is provided an improved communication method executed by a communication terminal that shares data with another communication terminal. The communication method includes, for example, receiving, from a communication management apparatus that manages the data shared with the another communication terminal, storage location information representing a storage location of background image data transmitted from the another communication terminal, transmitting a download request to an image storing apparatus corresponding to the storage position to request download of the background image data, and starting downloading the background image data from the image storing apparatus and receiving, from the communication management apparatus, stroke data of a stoke image rendered on the another communication terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 6A and 6B are diagrams illustrating an example of the functional configuration of the communication system of the embodiment:

FIG. 7 is a diagram schematically illustrating an example of display screen information of the embodiment;

FIG. 8 is a diagram schematically illustrating an example of operation information stored in an operation information management database of the embodiment;

FIG. 9 is a conceptual diagram illustrating an example of an authentication management table of the embodiment;

FIG. 10 is a conceptual diagram illustrating an example of a terminal management table of the embodiment;

FIG. 11 is a conceptual diagram illustrating an example of a destination list management table of the embodiment;

FIG. 12 is a conceptual diagram illustrating an example of a session management table of the embodiment;

FIG. 13 is a conceptual diagram illustrating an example of a relay apparatus management table of the embodiment, FIG. 14 is a conceptual diagram illustrating an example of a shared data management table of the embodiment;

FIG. 16 is a diagram illustrating an example of a destination list screen displayed on one of the electronic whiteboards of the embodiment;

FIG. 23 is a sequence diagram illustrating an example of a data sharing process between the electronic whiteboards in the communication system according to a first modified example of the embodiment.

Figure 1:
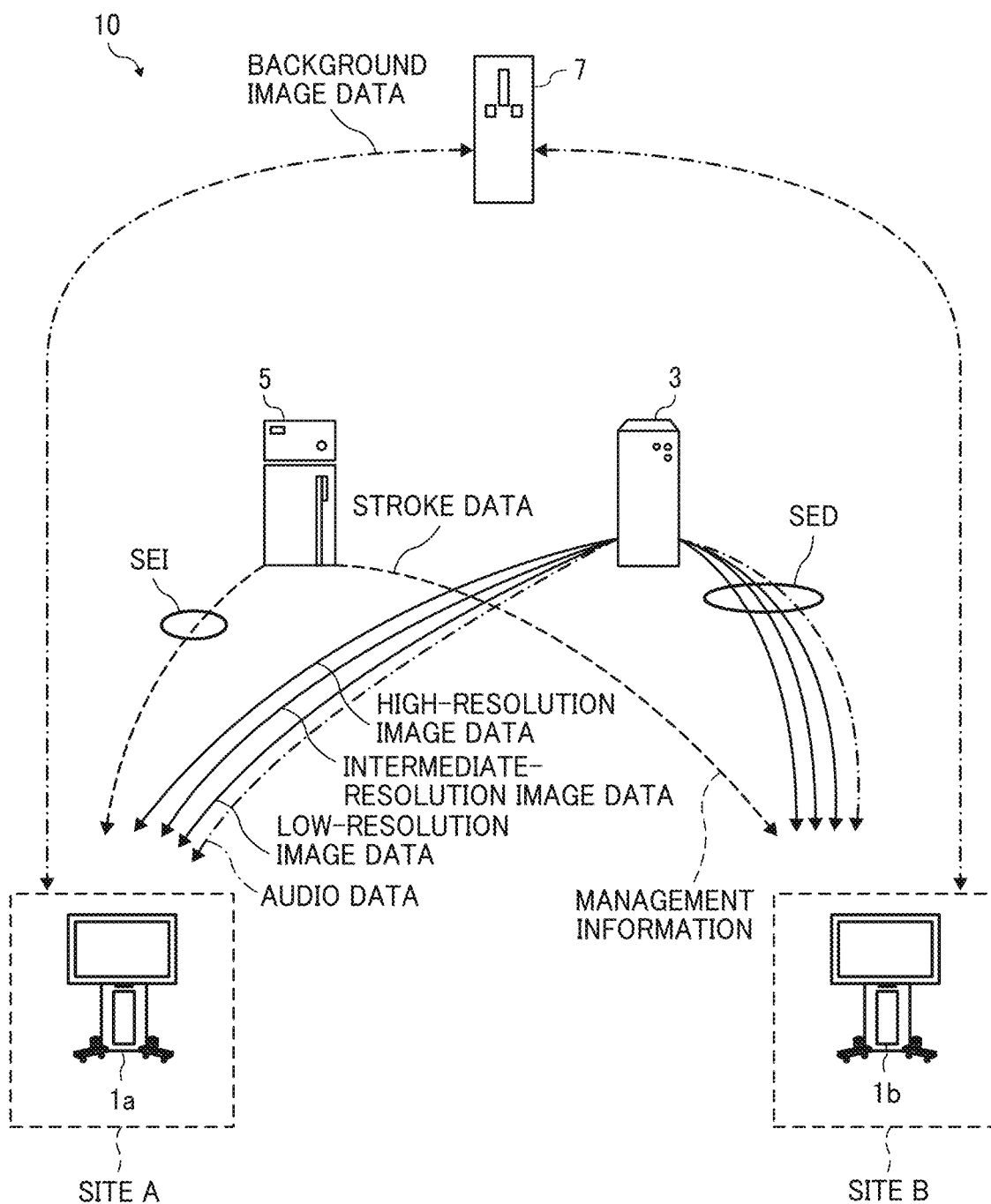
FIG. 1 is a schematic diagram illustrating an example of communication routes in a communication system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment for implementing the present invention will be described below with reference to the drawings.
Schematic Configuration of Communication System
Communication Routes With reference to FIG. 1, a description will be given of a communication system 10 of the embodiment that enables a video conference between a plurality of electronic whiteboards 1a and 1b, while allowing users to perform rendering on the electronic whiteboards 1a and 1b.

FIG. 1 is a schematic diagram illustrating an example of communication routes in the communication system 10 of the embodiment. The video conference may also be referred to as the television (TV) conference or a remote conference, for example. The video conference, the TV conference, or the remote conference is an example of a session for sharing image data and stroke data between a plurality of terminals. For example, the session for sharing the image data and the stroke data may be a session other than the conference, such as distance learning, remote diagnosis, meeting, or simple conversation. Further, the session for sharing the image data and the stroke data may be used for unidirectional provision of information.

The communication system 10 includes the plurality of electronic whiteboards 1a and 1b, at least one relay apparatus 3, a communication management apparatus 5, and an image storing apparatus 7. The electronic whiteboards 1a and 1b communicate therebetween image data and audio data for communication and content data such as image data and stroke data for sharing. The stroke data is data for reproducing (i.e., duplicating) a stroke image, and includes coordinate data, line width data, line color data, vector data, and data representing the writing pressure applied to render a stroke, for example. The stroke data is transmitted and received between the electronic whiteboards 1a and 1b as a serialized character string. Each of the electronic whiteboards 1a and 1b transmits and receives therebetween the image data and the audio data for communication to reproduce a site image and sound of the site at which the other electronic whiteboard 1a or 1b is located, thereby performing remote video communication.

With the electronic whiteboards 1a and 1b transmitting and receiving therebetween the image data of a background image for sharing, the users of the communication system 10 (i.e., the participants of the video conference) share the same background image. The background image is an image displayed on respective displays of the electronic whiteboards 1a and 1b. In the following description, the electronic whiteboards 1a and 1b may be collectively referred to as the electronic whiteboards 1. The background image includes the image of a material for a conference, for example, which is read from an electronic file and displayed on a display 180 (see FIG. 2) of the electronic whiteboard 1. The image data of the background image is transmitted and received in a file format such as the joint photographic experts group (JPEG) format. The electronic whiteboards 1a and 1b further transmit and receive therebetween the stroke data of the stroke image for sharing, thereby enabling the users of the communication system 10 (i.e., the participants of the video conference) to share the same stroke image. The stroke image is the image of a line, for example, which is rendered based on a handwritten stroke made by a user with an electronic pen, for example. The stroke image is displayed based on the stroke data, which represents points identifying coordinates on the display 180.

The electronic whiteboards 1 included in the communication system 10 are not limited to the two electronic whiteboards 1a and 1b, and thus the communication system 10 may include three or more electronic whiteboards 1. Each of the electronic whiteboards 1 is an example of a communication terminal having functions such as a communication function, a rendering function, and a display function. For example, the communication terminal may be a personal computer (PC), a smartphone, a tablet terminal, a smartwatch, a car navigation terminal, a gaming device, or a telepresence robot installed with an application program compatible with the communication system 10. Further, the communication terminal may be medical equipment, in which case the background image may be the image of a patient.

FIG. 1 illustrates the electronic whiteboards 1a and 1b each as an example of an electronic whiteboard with a video conference function. The site image, which is based on site image data, may be a video or still image.

An electronic whiteboard as a source of a video conference start request will be referred to as the starting terminal, and an electronic whiteboard as a destination to which the video conference start request is transmitted or relayed will be referred to as the destination terminal. In FIG. 1, the electronic whiteboard 1a at a site A and the electronic whiteboard 1b at a site B are illustrated as the starting terminal and the destination terminal, respectively. When the video conference start request is transmitted from the electronic whiteboard 1b, however, the electronic whiteboard 1b serves as the starting terminal, and the electronic whiteboard 1a serves as the destination terminal. The electronic whiteboards 1a and 1b may be used not only in communication between a plurality of offices and communication between different rooms in the same office but also in communication in the same room, communication between an indoor space and an outdoor space, and communication between an outdoor space and another outdoor space.

The relay apparatus 3, which is implemented by a computer, performs a process of relaying the content data for communication between the electronic whiteboards 1a and 1b.

The communication management apparatus 5, which is implemented by a computer, performs login authentication of the electronic whiteboards 1a and 1b and centrally manages the respective communication states of the electronic whiteboards 1a and 1b, the communication state of the relay apparatus 3, and a destination list. The communication management apparatus 5 further relays the stroke data for sharing between the electronic whiteboards 1a and 1b.

The image storing apparatus 7, which is implemented by a computer, stores the image data of the background image for sharing uploaded from the electronic whiteboard 1a and downloads the image data to the electronic whiteboard 1b, and vice versa. That is, the image storing apparatus 7 stores the image data uploaded from the electronic whiteboard 1b and downloads the image data to the electronic whiteboard 1a.

Each of the relay apparatus 3, the communication management apparatus 5, and the image storing apparatus 7 may be implemented by a single computer, or may be implemented by a plurality of computers to which units (i.e., functions or devices) of the apparatus are divided and allocated as desired. The communication management apparatus 5 and the image storing apparatus 7 form a server system 6 (see FIG. 5) that manages the data shared by the electronic whiteboards 1a and 1b. The server system 6 may be implemented by a single computer including the units (i.e., functions or devices) of the communication management apparatus 5 and the image storing apparatus 7. Further, instead of the communication management apparatus 5, the image storing apparatus 7 may relay the stroke data for sharing between the electronic whiteboards 1a and 1b.

In the communication system 10, a management information session SEI is established between the electronic whiteboards 1a and 1b to transmit and receive therebetween various management information via the communication management apparatus 5. Further, four sessions are established between the electronic whiteboards 1a and 1b to transmit and receive therebetween four types of data: high-resolution site image data, intermediate-resolution site image data, low-resolution site image data, and audio data, via the relay apparatus 3. In FIG. 1, the four sessions are collectively illustrated as an image and audio data session SED. The image and audio data session SED does not necessarily include four sessions, and may include three or less sessions or five or more sessions. Further, the communication session may be established directly between the starting terminal and the destination terminal without via the relay apparatus 3. Further, in the communication system 10, the communication management apparatus 5 may have the function of the relay apparatus 3 such that the image and audio data session SED is established between the electronic whiteboards 1a and 1b via the communication management apparatus 5. Further, in the communication system 10, the stroke data is transmitted and received between the electronic whiteboards 1a and 1b via the management information session SEI.

The image resolution of the site image data in the present embodiment will be described.

The low-resolution site image data, which forms a base image, includes 160 pixels in the horizontal direction by 120 pixels in the vertical direction, for example. The intermediate-resolution site image data includes 320 pixels in the horizontal direction by 240 pixels in the vertical direction, for example. The high-resolution site image data includes 640 pixels in the horizontal direction by 480 pixels in the vertical direction, for example. When the site image data routes through a narrow band path, low-quality image data including the low-resolution site image data for forming the base image is relayed. When the site image data routes through a relatively wide band path, intermediate-quality image data including the low-resolution site image data for forming the base image and the intermediate-resolution site image data is relayed. When the site image data routes through a substantially wide band path, high-quality image data including the low-resolution site image data for forming the base image, the intermediate-resolution site image data, and the high-resolution site image data is relayed. The audio data is smaller in data size than the site image data, and thus is relayed even with a narrow band path.

Use of Electronic Whiteboard

Figure 2:
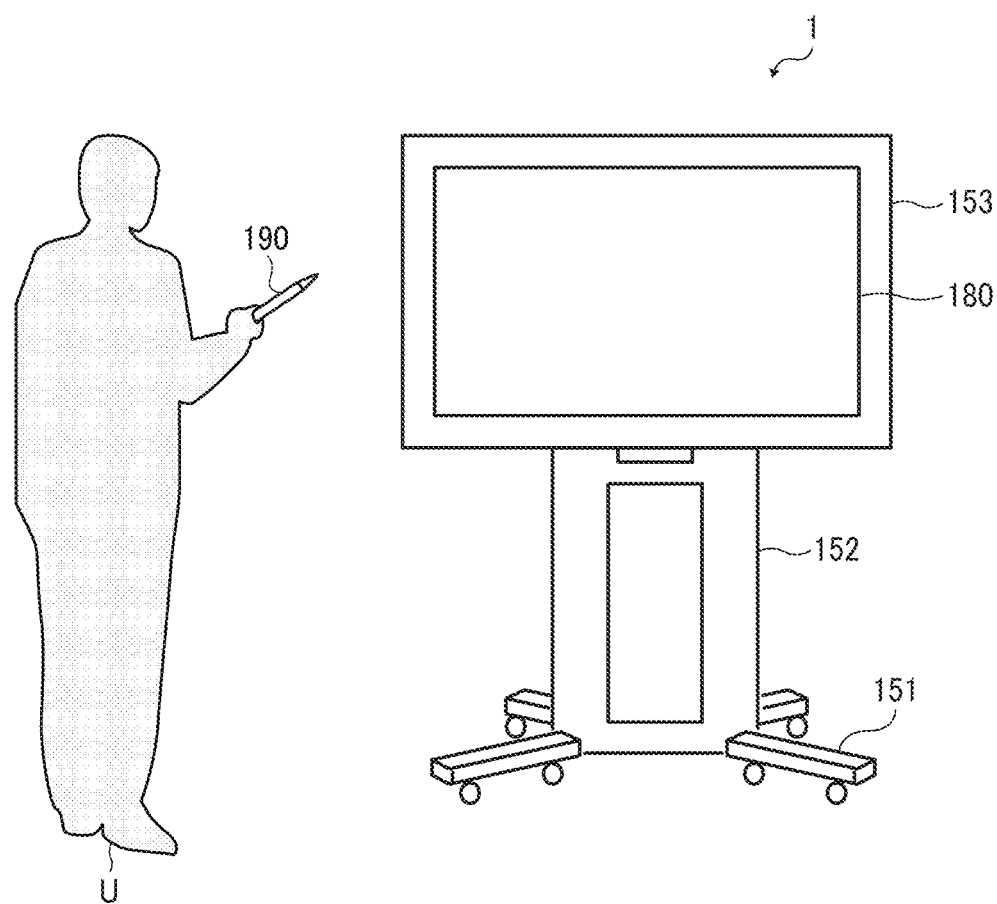
FIG. 2 is a diagram illustrating use of an electronic whiteboard included in the communication system of the embodiment.

FIG. 2 is a diagram illustrating use of the electronic whiteboard 1 of the embodiment. As illustrated in FIG. 2, the electronic whiteboard 1 includes a foot 151, a support post 152, a main unit 153, and the display 180. A lower side of the foot 151 is equipped with a plurality of casters, and an upper side of the foot 151 is equipped with the support post 152. The main unit 153 is disposed on an upper side of the support post 152, and has a front surface equipped with the display 180. The main unit 153 includes therein a later-described central processing unit (CPU) 101 (see FIG. 3). A user U inputs (i.e., renders) the stroke image of a letter or character, for example, on the display 180 with an electronic pen 190.

Hardware Configurations

Figure 3:
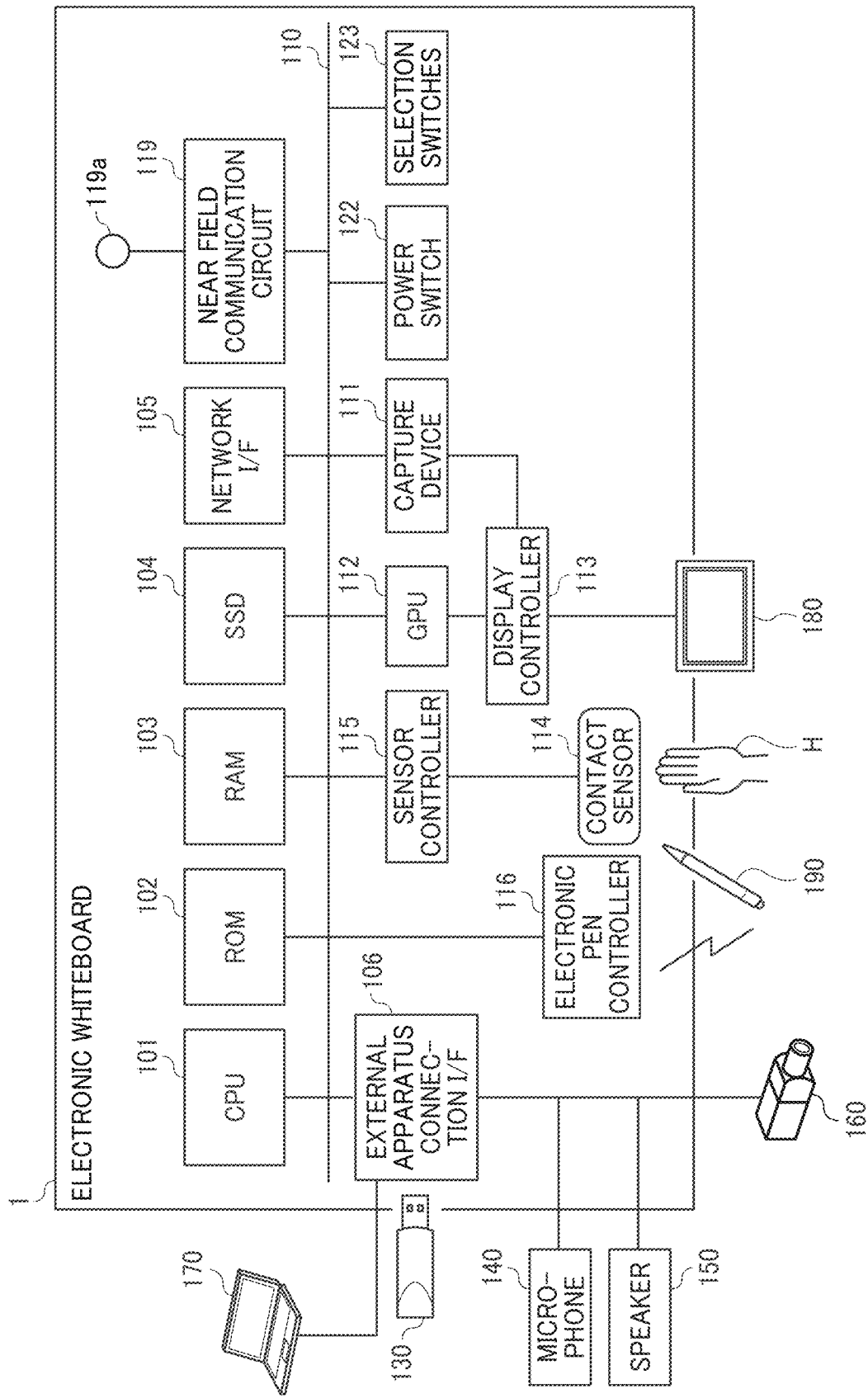
FIG. 3 is a diagram illustrating an example of the hardware configuration of the electronic whiteboard of the embodiment.
Figure 4:
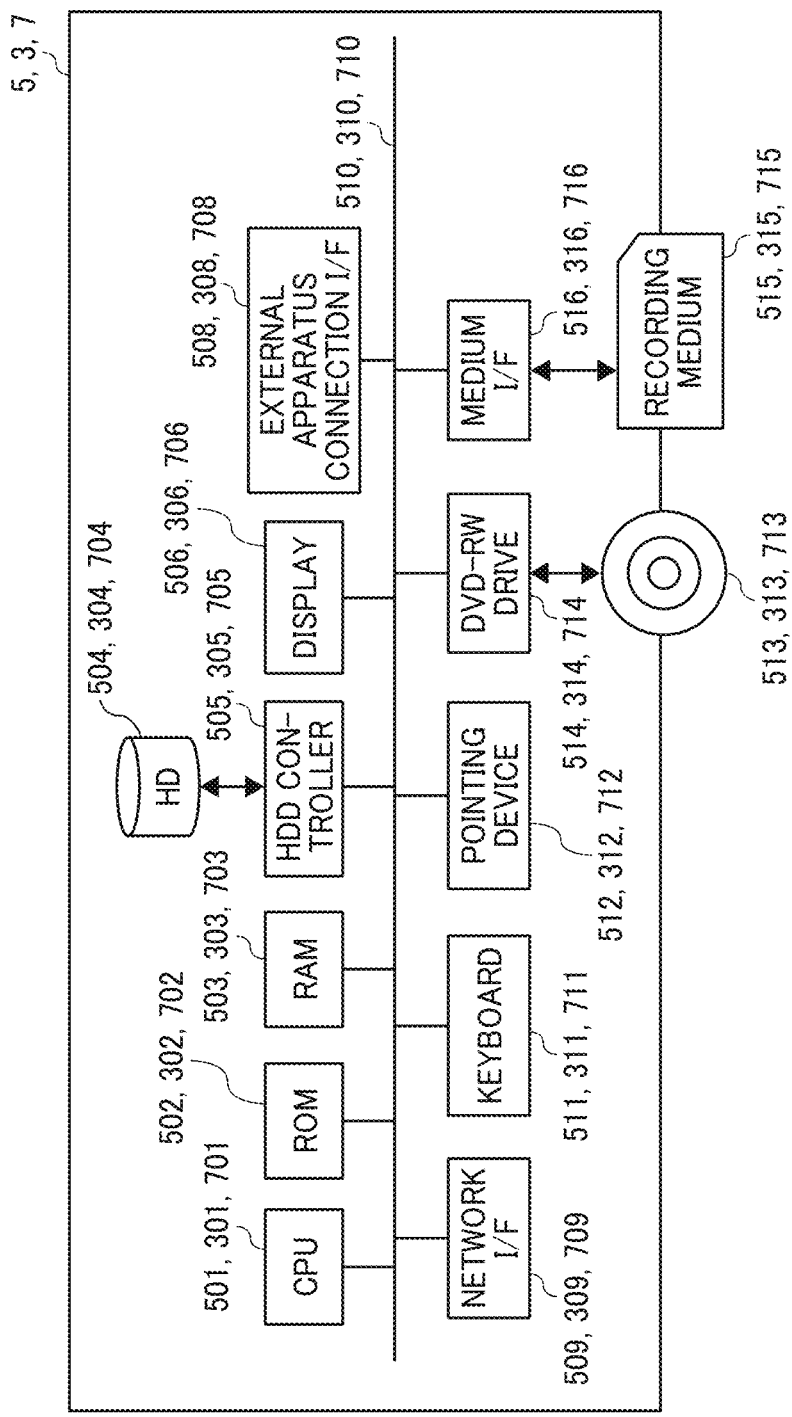
FIG. 4 is a diagram illustrating an example of the hardware configuration of each of a communication management apparatus, a relay apparatus, and an image storing apparatus included in the communication system of the embodiment.

With reference to FIGS. 3 and 4, a description will be given of respective hardware configurations of apparatuses and terminals forming the communication system 10. A component may be added to or removed from each of the hardware configurations in FIGS. 3 and 4 as necessary.

Hardware Configuration of Electronic Whiteboard

FIG. 3 is a diagram illustrating an example of the hardware configuration of the electronic whiteboard 1 of the embodiment. As illustrated in FIG. 3, the electronic whiteboard 1 includes the CPU 101, a read only memory (ROM) 102, a random access memory (RAM) 103, a solid state drive (SSD) 104, a network interface (I/F) 105, and an external apparatus connection I/F 106.

The CPU 101 controls an overall operation of the electronic whiteboard 1. The ROM 102 is a nonvolatile memory that stores a program for the CPU 101 and a program used to drive the CPU 101 such as an initial program loader (IPL). The RAM 103 is a volatile memory used as a work area for the CPU 101. The SSD 104 is a high-capacity memory that stores various data of a program for the electronic whiteboard 1, for example. The network I/F 105 is a communication interface for connecting the electronic whiteboard 1 to a communication network 100 (see FIG. 5) to perform communication. The external apparatus connection I/F 106 is an interface for connecting the electronic whiteboard 1 to various external apparatuses. The external apparatuses in this case include a universal serial bus (USB) memory 130 and other external apparatuses such as a microphone 140, a speaker 150, and a camera 160, for example.

The electronic whiteboard 1 further includes a capture device 111, a graphics processing unit (GPU) 112, a display controller 113, a contact sensor 114, a sensor controller 115, an electronic pen controller 116, a near field communication circuit 119, an antenna 119a for the near field communication circuit 119, a power switch 122, and selection switches 123.

The capture device 111 displays image data (i.e., image information) on a display of an external PC 170, for example, as a still or video image. The GPU 112 is a semiconductor chip processor dedicated to graphics processing. The display controller 113 controls and manages screen display to output an image from the GPU 112 to the display 180, for example. The contact sensor 114 detects the contact of the electronic pen 190 or a hand H of a user, for example, on the display 180. The sensor controller 115 controls the processing of the contact sensor 114. The contact sensor 114 performs input and detection of coordinates in accordance with an infrared blocking method. In this method of inputting and detecting coordinates, two light emitting and receiving devices disposed on opposite end portions of an upper area of the display 180 radiate a plurality of infrared rays parallel to the display 180, and receive rays of light reflected by a reflecting member disposed around the display 180 and returning on optical paths of the rays radiated by the two light emitting and receiving devices. The contact sensor 114 outputs, to the sensor controller 115, identifiers (IDs) of the infrared rays radiated by the two light emitting and receiving devices and blocked by an object. Then, the sensor controller 115 identifies the position of the coordinates corresponding to the position of contact of the object on the display 180. The electronic pen controller 116 communicates with the electronic pen 190 to determine contact or non-contact of the head or end of the electronic pen 190 on the display 180. The near field communication circuit 119 is a communication circuit conforming to a standard such as the near field communication (NFC) or Bluetooth (registered trademark) standard. The power switch 122 is a switch for switching on or off power supply to the electronic whiteboard 1. The selection switches 123 are switches for adjusting parameters such as the brightness and the color tone of the image displayed on the display 180, for example.

The electronic whiteboard 1 further includes a bus line 110, which includes address buses and data buses to electrically connect the CPU 101 and the other components in FIG. 3 to each other.

The contact sensor 114 is not limited to the infrared blocking method, and may employ a different type of detecting device, such as a capacitance touch panel that identifies the contact position by detecting a change in capacitance, a resistive touch panel that identifies the contact position by detecting a change in voltage of two resistance films facing each other, or an electromagnetic induction touch panel that identifies the contact position by detecting electromagnetic induction caused by contact of an object on a display. Further, the electronic pen controller 116 may determine contact or non-contact of a part of the electronic pen 190 held by the user or another part of the electronic pen 190, as well as the head or end of the electronic pen 190.

Hardware Configurations of Communication Management Apparatus, Relay Apparatus, and Image Storing Apparatus FIG. 4 is a diagram illustrating an example of the hardware configuration of each of the communication management apparatus 5, the relay apparatus 3, and the image storing apparatus 7 of the embodiment. A computer as an example of the communication management apparatus 5 includes a CPU 501, a ROM 502, a RAM 503, a hard disk (HD) 504, a hard disk drive (HDD) controller 505, a display 506, an external apparatus connection I/F 508, a network IF 509, a keyboard 511, a pointing device 512, a digital versatile disc rewritable (DVD-RW) drive 514, a medium I/F 516, and a bus line 510.

The CPU 501 controls an overall operation of the communication management apparatus 5. The ROM 502 is a nonvolatile memory that stores a program used to drive the CPU 501 such as the IPL. The RAM 503 is a volatile memory used as a work area for the CPU 501. The HD 504 is a high-capacity memory that stores various data of a communication management program, for example. The HDD controller 505 controls writing and reading of various data to and from the HD 504 under the control of the CPU 501. The display 506 displays various information such as a cursor, menus, windows, text, and images. The external apparatus connection I/F 508 is an interface for connecting the communication management apparatus 5 to various external apparatuses. The network I/F 509 is an interface for performing data communication via the communication network 100 such as the Internet. The keyboard 511 is an input device including a plurality of keys for inputting text, numerical values, and various instructions, for example. The pointing device 512 is an input device used to select and execute various instructions, select a processing target, and move the cursor, for example. The DVD-RW drive 514 controls writing (i.e., storage) and reading of data to and from a DVD-RW 513. The DVD-RW 513 may be replaced by a DVD-recordable (DVD-R), for example. Further, the DVD-RW drive 514 may be replaced by a Blu-ray (registered trademark) drive that controls writing (i.e., storage) and reading of data to and from a disc such as a Blu-ray disc recordable erasable (BD-RE) or a compact disc rewritable (CD-RW) drive that controls writing (i.e., storage) and reading of data to and from a disc such as a CD-RW. The medium IF 516 controls writing (i.e., storage) and reading of data to and from a recording medium 515 such as a flash memory. The bus line 510 includes address buses and data buses to electrically connect the CPU 501 and the other components in FIG. 4 to each other.

The relay apparatus 3 is implemented by a typical computer. As illustrated in FIG. 4, the relay apparatus 3 includes a CPU 301, a ROM 302, a RAM 303, an HD 304, an HDD controller 305, a display 306, an external apparatus connection I/F 308, a network I/F 309, a keyboard 311, a pointing device 312, a DVD-RW drive 314, a medium I/F 316, and a bus line 310. These components are similar in configuration to the CPU 501, the ROM 502, the RAM 503, the HD 504, the HDD controller 505, the display 506, the external apparatus connection I/F 508, the network I/F 509, the keyboard 511, the pointing device 512, the DVD-RW drive 514, the medium I/F 516, and the bus line 510 of the communication management apparatus 5, and thus description thereof will be omitted. In the relay apparatus 3, however, the HD 304 stores a relay program.

The image storing apparatus 7 is implemented by a typical computer. As illustrated in FIG. 4, the image storing apparatus 7 includes a CPU 701, a ROM 702, a RAM 703, an HD 704, an HDD controller 705, a display 706, an external apparatus connection I/F 708, a network I/F 709, a keyboard 711, a pointing device 712, a DVD-RW drive 714, a medium I/F 716, and a bus line 710. These components are similar in configuration to the CPU 501, the ROM 502, the RAM 503, the HD 504, the HDD controller 505, the display 506, the external apparatus connection I/F 508, the network I/F 50), the keyboard 511, the pointing device 512, the DVD-RW drive 514, the medium I/F 516, and the bus line 510 of the communication management apparatus 5, and thus description thereof will be omitted. In the image storing apparatus 7, however, the HD 704 stores an image storage program.

Each of the above-described programs may be distributed as recorded on a computer readable recording medium in an installable or executable file format. Examples of the recording medium include a compact disc recordable (CD-R), a DVD, a Blu-ray disc, and a secure digital (SD) card. The recording medium may be shipped to the market as a program product. For example, the electronic whiteboard 1 implements a communication method of the present invention by executing a program of the present invention.

General Arrangement of Communication System

A general arrangement of the communication system 10 will be described with FIG. 5.

Figure 5:
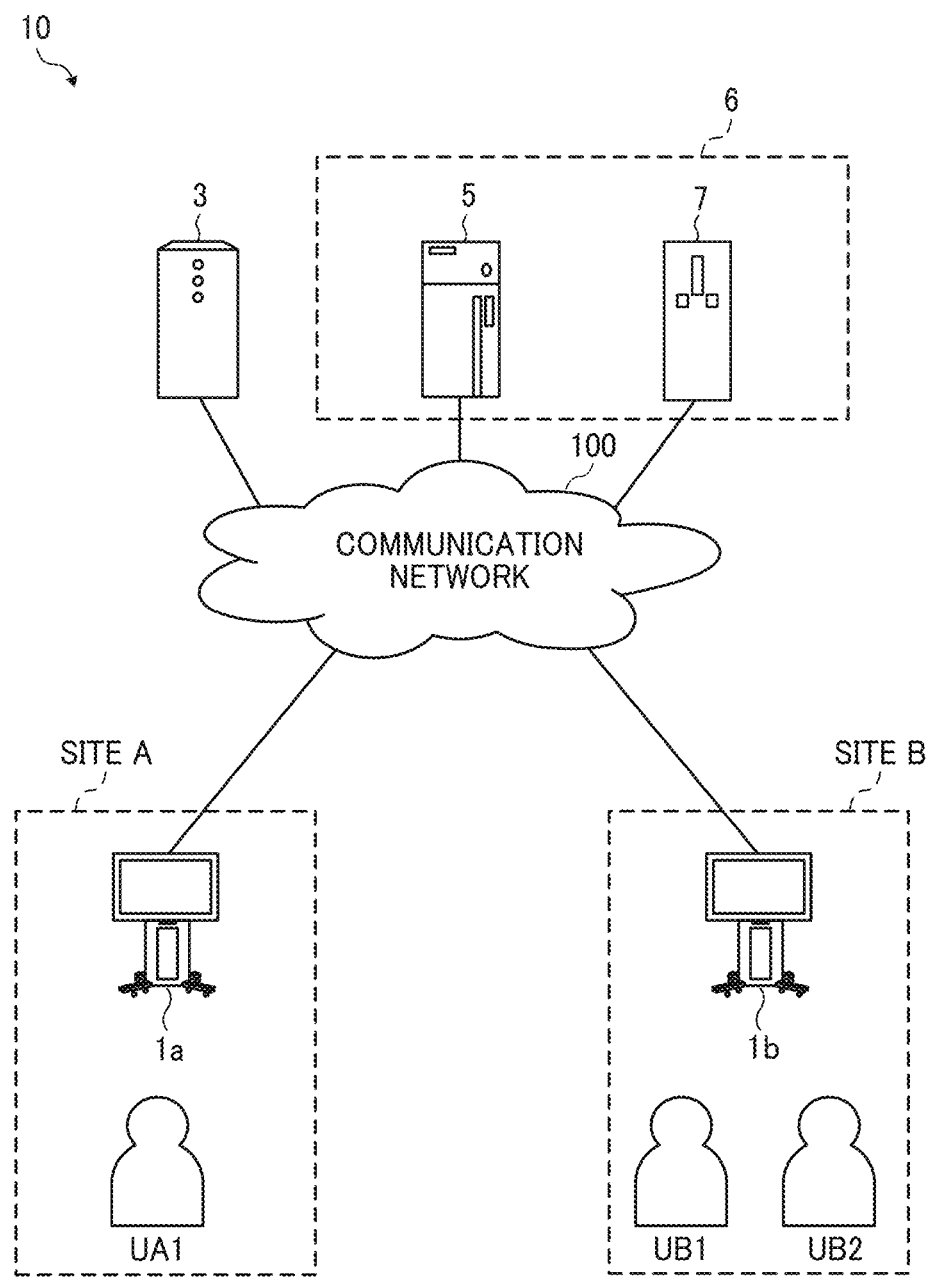
FIG. 5 is a diagram illustrating an example of the system configuration of the communication system of the embodiment.

FIG. 5 is a diagram illustrating an example of the system configuration of the communication system 10 of the embodiment. In FIG. 5, the electronic whiteboard 1a and the electronic whiteboard 1b are located at the site A and the site B, respectively. The site A may be a Tokyo branch in Japan, and the site B may be a Beijing branch in China, for example. It is assumed here that the electronic whiteboard 1a is used by a user UA1 at the site A, and that the electronic whiteboard 1b is used by users UB1 and UB2 at the site B.

The electronic whiteboards 1a and 1b, the relay apparatus 3, the communication management apparatus 5, and the image storing apparatus 7 transmit and receive data to and from each other via the communication network 100 such as the Internet or a local area network (LAN), for example. The communication via the communication network 100 is not limited to wired communication, and wireless communication conforming to a standard such as the wireless fidelity (Wi-Fi, registered trademark) standard may take place in some part of the communication network 100.

Functional Configuration of Communication System

A functional configuration of the communication system 10 of the embodiment will be described with FIGS. 6A to 14.

Figure 6B:
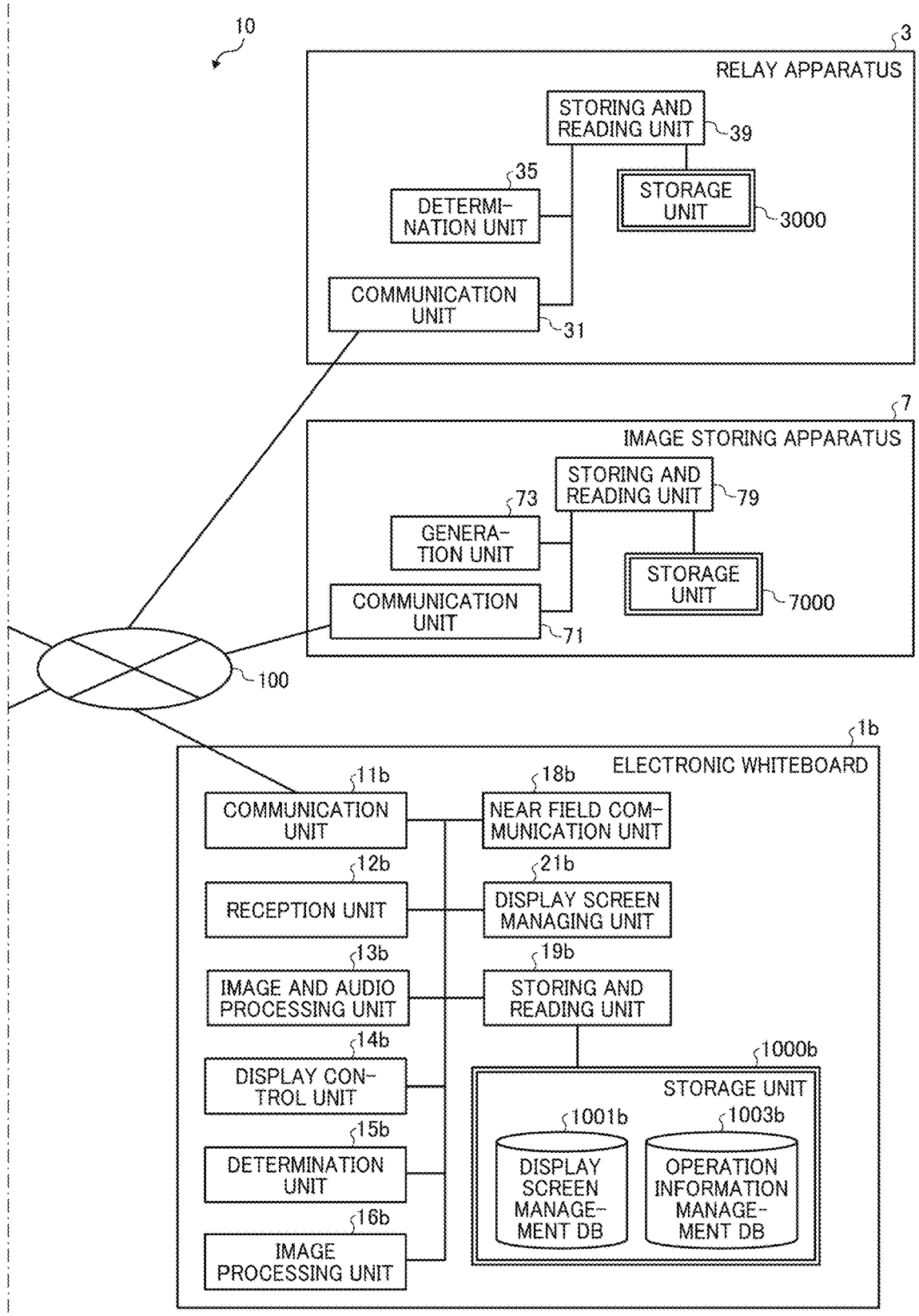

FIGS. 6A and 6B are diagrams illustrating an example of the functional configuration of the communication system 10 of the embodiment. FIGS. 6A and 6B illustrate parts of the terminals, apparatuses, and server system in FIG. 5 related to later-described processes and operations.

Functional Configuration of Electronic Whiteboard

A functional configuration of each of the electronic whiteboards 1a and 1b will be described with FIGS. 6A and 6B. Since the electronic whiteboards 1a and 1b have similar functions, the following description will be given of the functions of the electronic whiteboard 1 with omission of the suffix a or b after each reference numeral.

The electronic whiteboard 1 includes a communication unit 11, a receiving unit 12, an image and audio processing unit 13, a display control unit 14, a determination unit 15, an image processing unit 16, a near field communication unit 18, a display screen managing unit 21, and a storing and reading unit 19. Each of these units is a function or functional unit implemented when at least one of the components illustrated in FIG. 3 operates in response to a command from the CPU 101 in accordance with the program deployed on the RAM 103 from the SSD 104. The electronic whiteboard 1 further includes a storage unit 1000 implemented by the RAM 103, the SSD 104, or the USB memory 130 illustrated in FIG. 3. The storage unit 1000 stores a display screen management database (DB) 1001 and an operation information management DB 1003.

The communication unit 11 is a function implemented by a command from the CPU 101 in FIG. 3 and the network I/F 105 in FIG. 3 to transmit and receive various data and information to and from another terminal, apparatus, or system via the communication network 100. The communication unit 11 also functions as a starting unit, for example, to perform a process of starting communication with another electronic whiteboard 1. The communication unit 11 further transmits and receives rendering screen data (e.g., the background image data and the stroke data) to be displayed on the display 180 to and from another electronic whiteboard 1 via the communication management apparatus 5.

The receiving unit 12 is implemented by a command from the CPU 101 in FIG. 3 and the contact sensor 114 and the electronic pen controller 116 in FIG. 3 to receive various inputs made by the user with the electronic pen 190, for example.

The image and audio processing unit 13 is implemented by a command from the CPU 101 in FIG. 3 to perform a major process of the video conference function. For example, based on signals output from the microphone 140 and the camera 160, the image and audio processing unit 13 performs digital processing such as encoding of the site image data and the audio data. Further, for example, based on the site image data and the audio data received by the communication unit 11, the image and audio processing unit 13 generates an image signal and an audio signal. The image and audio processing unit 13 further performs a process of combining site image data items of different resolutions, for example.

The display control unit 14 is a function implemented by a command from the CPU 101 in FIG. 3 and the display controller 113 in FIG. 3 to perform control for outputting signals such as the image signal to the display 180. For example, the display control unit 14 controls the display 180 to display a rendering screen based on the rendering screen data generated by the image processing unit 16.

The determination unit 15 is a function implemented by a command from the CPU 101 in FIG. 3 to make various determinations.

The image processing unit 16 is a function implemented by a command from the CPU 101 in FIG. 3 and the capture device 111 in FIG. 3 to perform a major process of an electronic whiteboard function. The image processing unit 16 generates, for example, the stroke data and the stroke image based on the stroke made with the electronic pen 190, for example, and received by the receiving unit 12. The image processing unit 16 further generates, for example, the stroke image based on the stroke data received by the communication unit 11. The image processing unit 16 further generates the rendering screen data including the generated stroke image, for example.

The near field communication unit 18 is a function implemented by a command from the CPU 101 in FIG. 3 and the near field communication circuit 119 and the antenna 119*a* in FIG. 3 to provide data to or acquire data from another terminal having a near field communication unit, such as an integrated circuit (IC) card or a smartphone, in near field wireless communication.

The display screen managing unit 21 is a function implemented by a command from the CPU 101 in FIG. 3 to manage screen data forming a display screen shared with another electronic whiteboard 1.

The storing and reading unit 19 is a function implemented by a command from the CPU 101 in FIG. 3 to store various data in the storage unit 1000 and read therefrom various data. Each time the site image data and the audio data are received in the communication with another terminal, the site image data and audio data stored in the storage unit 1000 are overwritten with the newly received site image data and audio data. The display 180 displays an image based on the site image data before being overwritten with the newly-received site image data, and the speaker 150 outputs sound based on the audio data before being overwritten with the newly-received audio data. The storage unit 1000 further stores the stroke data of the stroke image rendered on the display 180 and the background image data of the background image displayed on the display 180.

Display Screen Information

FIG. 7 is a diagram schematically illustrating an example of display screen information of the embodiment. FIG. 7 illustrates an example of the conceptual image of the information of the display screen for display on the electronic whiteboard 1, which is stored in the display screen management DB 1001.

In the example of FIG. 7, the information of the display screen has a hierarchical structure with layers of information: "meeting," "page" (i.e., pages P1, P2, P3, and P4), and "stroke" (i.e., strokes SR1, SR2, SR3, SR4, and SR5). The information "stroke" corresponds to the stroke data of the embodiment, and is managed under the corresponding page. The information "page" represents the stored image data of a single-page screen (i.e., the display screen) displayed on the display 180. The information "meeting" represents the information of the meeting taking place on the electronic whiteboard 1. For example, the stroke SR1 includes a stroke ID identifying the stroke SR1 (id=aaaaa), information identifying the page P4 including the stroke SR1 (parent=pag04), a global ID (gid) of the corresponding rendering data G1 (gid=g048), and the rendering data G1. If an operation such as a moving operation is performed on the stroke image represented by the stroke SR1, for example, the stroke ID (id=aaaaa) is maintained, but the rendering data G1 and the global ID identifying the rendering data G1 (gid=g048) are updated. The rendering data G1, which is rendering data for reproducing the stroke SR1, includes coordinate data, line width data, line color data, and vector data, for example.

The electronic whiteboard 1 is capable of switching between pages. The information "page" corresponds to the pages of the electronic whiteboard 1. For example, the page P1 includes a page ID identifying the page P1 (id=pag1), information identifying the meeting taking place on the electronic whiteboard 1 (parent=se01), a global ID identifying the page (i.e., page data) (gid=g01), and image data IM1. The image data IM1 is the image data of the background image forming the page P1. That is, the image data IM1 represents the background image displayed on the page P1. The page P2 does not include image data. That is, the page 2 does not include a background image, i.e., the background of the page P2 is blank.

The information "meeting" corresponds to the meeting taking place on the electronic whiteboard 1, and is managed with a meeting ID identifying the meeting and a global ID identifying the meeting (i.e., meeting information) (gid=g2). When the electronic whiteboard 1 is in remote communication with another electronic whiteboard 1, the meeting ID corresponds to a session ID identifying the corresponding session (id=se01).

For example, the image processing unit 16 of the electronic whiteboard 1 generates the stroke image rendered on the page P4 with the rendering data items G1, G2, G3, G4, and G5 included in the strokes SR1, SR2, SR3, SR4, and SR5, respectively. The global IDs appearing in the respective layers are assigned by the communication management apparatus 5 when the electronic whiteboard 1 shares data with another electronic whiteboard 1. The hierarchical structure of the shared data illustrated in FIG. 7 is shared by the plurality of electronic whiteboards 1.

Operation Information

Operation information representing an operation performed on the display screen of the electronic whiteboard 1 will be described with FIG. 8.

FIG. 8 is a diagram schematically illustrating an example of the operation information of the embodiment. The operation information illustrated in FIG. 8 includes the information of the operation performed on the display screen displayed on the electronic whiteboard 1. The operation information illustrated in FIG. 8 includes a stroke ID (Id) for identifying the corresponding stroke data, a page ID (DistId) for identifying the page on which the stroke data is rendered, operation type information (Operation type) representing the type of the operation performed on the rendering screen, data type information (Data Type) representing the type of data as the operation target, and detailed data information (Data) representing the contents of the data as the operation target.

The operation type information represents the type of the operation performed by the user on a stroke or page in the display screen. If the operation target is the stroke, for example, the operation type information is described as "Add" when the stroke is rendered, described as "Remove" when the stroke is removed, and described as "Update" when the stroke is moved. Further, the data type information is described as "Stroke" when the operation target is the stroke, and described as "Page" when the operation target is the page. Further, when the operation target is the stroke, the detailed data information corresponds to the stroke data, and includes information such as the coordinate data, the line width data, and the line color data. The detailed data information corresponds to information "body" included in a later-described shared data management table (see FIG. 14). The detailed data information includes information according to the type of the performed operation. In the detailed data information, information such as the coordinate data is updated in accordance with the operation type described in the operation type information.

The operation target is not limited to the data of a stroke or page, and may be the data of an object that is a collection of strokes. The object may be optical character reader (OCR)-processed text of strokes recognized as a letter, a character, or a symbol such as a numerical symbol, a system-generated character representing the date or time, a particular figure such as a triangle, a star, or a circle, an arrow, a line segment, or a line such as a Bezier curve, for example.

Functional Configuration of Relay Apparatus

Referring back to FIG. 6B, a description will be given of a functional configuration of the relay apparatus 3.

The relay apparatus 3 includes a communication unit 31 (i.e., a forwarding unit), a determination unit 35, and a storing and reading unit 39. Each of these units is a function or functional unit implemented when at least one of the components illustrated in FIG. 4 operates in response to a command from the CPU 301 in accordance with the relay program deployed on the RAM 303 from the HD 304. The relay apparatus 3 further includes a storage unit 3000 implemented by the RAM 303, the HD 304, or a recording medium 315 illustrated in FIG. 4.

The communication unit 31 is a function implemented by a command from the CPU 301 in FIG. 4 and the network I/F 309 in FIG. 4 to transmit and receive various data and information to and from another terminal, apparatus, or system via the communication network 100. The communication unit 31 also functions as a forwarding unit to forward the site image data and the audio data transmitted from a particular terminal to another terminal.

The determination unit 35 is a function implemented by a command from the CPU 301 in FIG. 4 to make various determinations such as a determination on a data delay state.

The storing and reading unit 39 is a function implemented by a command from the CPU 301 in FIG. 4 to store various data in the storage unit 3000 and read therefrom various data.

Functional Configuration of Communication Management Apparatus

A functional configuration of the communication management apparatus 5 will be described with FIG. 6A.

The communication management apparatus 5 includes a communication unit 51, an authentication unit 52, a determination unit 53, a terminal managing unit 54, a session managing unit 55, a relay apparatus managing unit 56, a shared data managing unit 57, and a storing and reading unit 59. Each of these units is a function or functional unit implemented when at least one of the components illustrated in FIG. 4 operates in response to a command from the CPU 501 in accordance with the communication management program deployed on the RAM 503 from the HD 504. The communication management apparatus 5 further includes a storage unit 5000 implemented by the RAM 503, the HD 504, or the recording medium 515 illustrated in FIG. 4. The storage unit 5000 stores an authentication management DB 5001, a terminal management DB 5002, a destination list management DB 5003, a session management DB 5004, a relay apparatus management DB 5005, and a shared data management DB 5006.

The communication unit 51 is a function implemented by a command from the CPU 501 in FIG. 4 and the network I/F 509 in FIG. 4 to transmit and receive various data and information to and from another terminal or apparatus via the communication network 100. For example, the communication unit 51 receives stroke data transmitted to the electronic whiteboard 1 from another electronic whiteboard 1, and transmits stroke data to another electronic whiteboard 1.

The authentication unit 52 is a function implemented by a command from the CPU 501 in FIG. 4 to perform login authentication for a login requesting terminal. If the communication unit 51 receives login request information, the authentication unit 52 executes the login authentication process for the login requesting terminal with reference to the authentication management DB 5001.

The determination unit 53 is a function implemented by a command from the CPU 501 in FIG. 4 to make various determinations.

The terminal managing unit 54 is a function implemented by a command from the CPU 501 in FIG. 4 to manage various information of each of the electronic whiteboards 1 managed in the terminal management DB 5002 in accordance with the state of the electronic whiteboard 1. The terminal managing unit 54 updates the information of the terminal management DB 5002 such as the operation state of the electronic whiteboard 1, the time of receipt of information from the electronic whiteboard 1, and the internet protocol (IP) address of the electronic whiteboard 1, for example. The terminal managing unit 54 further manages the destination list management DB 5003. In response to receipt of a request from one of the electronic whiteboards 1, the terminal managing unit 54 provides the electronic whiteboard 1 with destination list information including the terminal IDs of destination candidate terminals managed in the destination list management DB 5003.

The session managing unit 55 is a function implemented by a command from the CPU 501 in FIG. 4 to manage the session held in the communication system 10. For example, in response to receipt of start request information from one of the electronic whiteboards 1, the session managing unit 55 generates the session ID for identifying the session. The start request information represents the request to start communication. Further, for example, the session managing unit 55 stores and manages various information of the session in the session management DB 5004 in association with the session ID.

The relay apparatus managing unit 56 is a function implemented by a command from the CPU 501 in FIG. 4. In the present embodiment, the communication system 10 includes one or more relay apparatuses 3. When the communication system 10 includes a plurality of relay apparatuses 3, the relay apparatus managing unit 56 selects one of the plurality of relay apparatuses 3 to be used for relaying the session. For example, the relay apparatus managing unit 56 manages the relay apparatus management DB 5005, and selects one of the plurality of relay apparatuses 3 based on various information of the relay apparatuses 3 stored in the relay apparatus management DB 5005. For example, based on the respective IP addresses of the relay apparatuses 3 stored in the relay apparatus management DB 5005 and the IP address of the starting terminal, the relay apparatus managing unit 56 selects one of the relay apparatuses 3 that is located near the starting terminal. Further, for example, the relay apparatus managing unit 56 selects one of the relay apparatuses 3 based on the respective maximum data transmission speeds of the relay apparatuses 3 stored in the relay apparatus management DB 5005. In the embodiment, a desired method may be employed to select the relay apparatus 3 for use in relaying the session.

The shared data managing unit 57 is a function implemented by a command from the CPU 501 in FIG. 4 to manage various data of the display screen transmitted and received between the electronic whiteboards 1 (i.e., communication terminals). For example, the shared data managing unit 57 receives the stroke data transmitted via the management information session SEI from one of the electronic whiteboards 1 participating in the session, and stores and manages the stroke data in the shared data management DB 5006 in association with the session ID.

The storing and reading unit 59 is a function implemented by a command from the CPU 501 in FIG. 4 to store various data in the storage unit 5000 and read therefrom various data.

Authentication Management Table

FIG. 9 is a conceptual diagram illustrating an example of an authentication management table of the embodiment. The authentication management DB 5001 in the storage unit 5000 is configured as the authentication management table as illustrated in FIG. 9. In the authentication management table, the respective terminal IDs of all electronic whiteboards 1 managed by the communication management apparatus 5 are managed in association with respective passwords. For example, the authentication management table illustrated in FIG. 9 indicates that the electronic whiteboard 1a (i.e., a communication terminal) has a terminal ID "01aa" and a password "aaaa." The password is an example of authentication information. The authentication information also includes an access token.

Terminal Management Table

FIG. 10 is a conceptual diagram illustrating an example of a terminal management table of the embodiment. The terminal management DB 5002 in the storage unit 5000 is configured as the terminal management table as illustrated in FIG. 10. In the terminal management table, the destination name, the operation state, the reception time, and the terminal IP address are managed in association with each other for each terminal ID. The terminal ID identifies the corresponding electronic whiteboard 1 (i.e., a communication terminal). The destination name represents the name of the electronic whiteboard 1 as the destination. The operation state represents the operation state of the electronic whiteboard 1. The reception time represents the date and time of receipt of the login request information by the communication management apparatus 5. The terminal IP address represents the IP address of the electronic whiteboard 1 (i.e., a communication terminal). For example, the terminal management table in FIG. 10 indicates that the electronic whiteboard 1a with the terminal ID "01aa" has a destination name "TERMINAL AA, TOKYO BRANCH, JAPAN," an operation state "ON-LINE (COMMUNICATION AVAILABLE)." a reception time of "13:40 on Feb. 10, 2020" as the date and time of receipt of the login request information by the communication management apparatus 5, and a terminal IP address "1.2.1.3" corresponding to the terminal ID "01aa." The terminal ID, the destination name, and the terminal IP address are stored in the terminal management table when the electronic whiteboard 1 is previously registered to receive a service provided by the communication management apparatus 5.

Destination List Management Table

FIG. 11 is a conceptual diagram illustrating an example of a destination list management table of the embodiment. The destination list management DB 5003 in the storage unit 5000 is configured as the destination list management table as illustrated in FIG. 11. In the destination list management table, the respective terminal IDs of all destination candidate terminals are managed in association with the terminal ID of the starting terminal. The starting terminal is the electronic whiteboard 1 that transmits a communication start request. The destination candidate terminals are the electronic whiteboards 1 registered as the candidates for the destination terminal corresponding to the starting terminal. For example, the destination list management table illustrated in FIG. 11 indicates that the destination candidate terminals to which the electronic whiteboard 1a with the terminal ID "01aa" (i.e., the starting terminal) is able to transmit the communication start request are electronic whiteboards 1 including the electronic whiteboard 1b with a terminal ID "01ba." The destination candidate terminals in the destination list management table are updated when a destination candidate terminal is added to or deleted from the destination list management table in response to receipt of an addition request or a deletion request from a given starting terminal to the communication management apparatus 5.

The destination list is an example of destination information. In the destination information, the information of the destination candidate terminals such as the terminal IDs thereof may be arranged in a format other than the list format.

Session Management Table

FIG. 12 is a conceptual diagram illustrating an example of a session management table of the embodiment. The session management DB 5004 in the storage unit 5000 is configured as the session management table as illustrated in FIG. 12. In the session management table, the relay apparatus ID, the starting terminal ID, the destination terminal ID, the delay time, and the delay information reception time are managed in association with each other for each session ID. The session ID identifies the session for implementing the communication between the relay apparatus 3 and the electronic white boards 1 (i.e., communication terminals). The relay apparatus ID is the apparatus ID of the relay apparatus 3 used in the session. The starting terminal ID is the terminal ID of the electronic whiteboard 1 serving as the starting terminal. The destination terminal ID is the terminal ID of the electronic white board 1 serving as the destination terminal. The delay time represents the delay time (milliseconds: ms) in the reception of the site image data by the destination terminal. The delay information reception time represents the date and time of receipt of delay information by the communication management apparatus 5. The delay information, which represents the delay time, is transmitted from the destination terminal. For example, the session management table illustrated in FIG. 12 indicates that the relay apparatus 3 with a relay apparatus ID "111a" relays the site image data and the audio data between an electronic white board 1 with a terminal ID "01aa" and an electronic white board 1 with a terminal ID "01db" in a communication session executed with a session ID "se01." The session management table further indicates that the delay time of the site image data in the electronic white board 1 serving as the destination terminal is 200 ms at "13:41 on Feb. 10, 2020."

Relay Apparatus Management Table

FIG. 13 is a conceptual diagram illustrating an example of a relay apparatus management table of the embodiment. The relay apparatus management DB 5005 in the storage unit 5000 is configured as the relay apparatus management table as illustrated in FIG. 13. In the relay apparatus management table, the operation state of each relay apparatus 3, the date and time of receipt of state information by the communication management apparatus 5, the IP address of the relay apparatus 3, and the maximum data transmission speed (megabits per second: Mbps) of the relay apparatus 3 are managed in association with each other for each relay apparatus ID. The relay apparatus ID represents the relay apparatus ID of the relay apparatus 3. The state information includes the information of the operation state. For example, the relay apparatus management table illustrated in FIG. 13 indicates that the operation state of the relay apparatus 3 with a relay apparatus ID "111a" is "ON-LINE," and that the date and time of receipt of the state information by the communication management apparatus 5 is "13:00 on Feb. 10, 2020." The relay apparatus management table further indicates that the relay apparatus 3 has an IP address "1.2.1.2" and a maximum data transmission speed of 100 Mbps.

Shared Data Management Table

FIG. 14 is a conceptual diagram illustrating an example of a shared data management table of the embodiment. The shared data management DB 5006 in the storage unit 5000 is configured as the shared data management table as illustrated in FIG. 14. In the shared data management table, various data of the display screen shared and stored by the electronic whiteboards 1 (i.e., communication terminals) is stored and managed for each session ID for identifying the session for implementing the communication between the electronic whiteboards 1 and the relay apparatus 3. The data of the shared data management table corresponds to the display screen information (see FIG. 7) stored in the display screen management DB 1001 in each of the electronic whiteboards 1.

The data of the shared data management table includes an ID for identifying the corresponding data item, a sequence number representing the generation order of the data item, information "body" representing the contents of the data item, and information "parent" for identifying higher-layer (i.e., parent) data of the data item. For example, in the case of meeting information representing a remote conference being held between a plurality of electronic whiteboards 1, the shared data management table includes a meeting ID (i.e., session ID) for identifying the remote conference being held, information "children" representing the pages generated in the remote conference, and information "current page" representing the page forming the display screen currently displayed on the electronic whiteboards 1. Further, in the case of page data, for example, the shared data management table includes the page ID for identifying the corresponding page (i.e., page data) and the uniform resource locator (URL) representing the storage location of the background image data forming the page.

Further, in the case of stroke data, for example, the shared data management table includes the stroke ID for identifying the stroke data generated by a stroke rendering event, the information representing the contents of the stroke data, and the information "parent" for identifying the page (i.e., page data) including the stroke. In this case, the information "body" representing the contents of the stroke data includes information such as the color of the rendered stroke, the width representing the thickness of the line of the rendered stroke, and the coordinates (x, y) of the vertices of the rendered stroke.

Herein, the stroke rendering refers to a process of inputting the rendering information performed by the user. For example, the stroke rendering is an event in which the user presses the electronic pen 190 against the display 180, moves the electronic pen 190 while in contact with the display 180, and releases the electronic pen 190 from the display 180. The color of the stroke is expressed by numerical values each ranging from 0 to 25 to represent the corresponding color component in the red-green-blue-alpha (RGBA) data format. The width representing the thickness of the line of the rendered stroke is represented by the number of pixels. Each of the vertices of the rendered stroke is represented by X and Y coordinates. The vertices are connected together by a Bezier curve to form a line segment representing the stroke. With the shared data management table, the communication management apparatus 5 manages the various data of the display screen including the stroke data generated in a video conference using a particular communication session, for example.

Functional Configuration of Image Storing Apparatus

Referring back to FIG. 6B, a description will be given of a functional configuration of the image storing apparatus 7.

The image storing apparatus 7 includes a communication unit 71, a generation unit 73, and a storing and reading unit 79. Each of these units is a function or functional unit implemented when at least one of the components illustrated in FIG. 4 operates in response to a command from the CPU 701 in accordance with the image storage program deployed on the RAM 703 from the HD 704. The image storing apparatus 7 further includes a storage unit 7000 implemented by the RAM 703, the HD 704, or a recording medium 715 illustrated in FIG. 4.

The communication unit 71 is a function implemented by a command from the CPU 701 in FIG. 4 and the network I/F 709 in FIG. 4 to transmit and receive various data and information to and from another terminal or apparatus via the communication network 100.

The generation unit 73 is a function implemented by a command from the CPU 701 in FIG. 4 to generate the URL representing the storage location of the background image data.

The storing and reading unit 79 is a function implemented by a command from the CPU 701 in FIG. 4 to store various data in the storage unit 7000 and read therefrom various data.

Processes and Operations of Embodiment

Processes and operations performed in the communication system 10 of the embodiment will be described with FIGS. 15 to 22D.

Preparatory Process for Remote Communication

A preparatory process for remote communication performed by the electronic whiteboard 1a as the login requesting terminal will first be described with FIGS. 15 and 16. The electronic whiteboard 1b performs a login request process similar to that performed by the electronic whiteboard 1a, and thus description thereof will be omitted.

Figure 15:
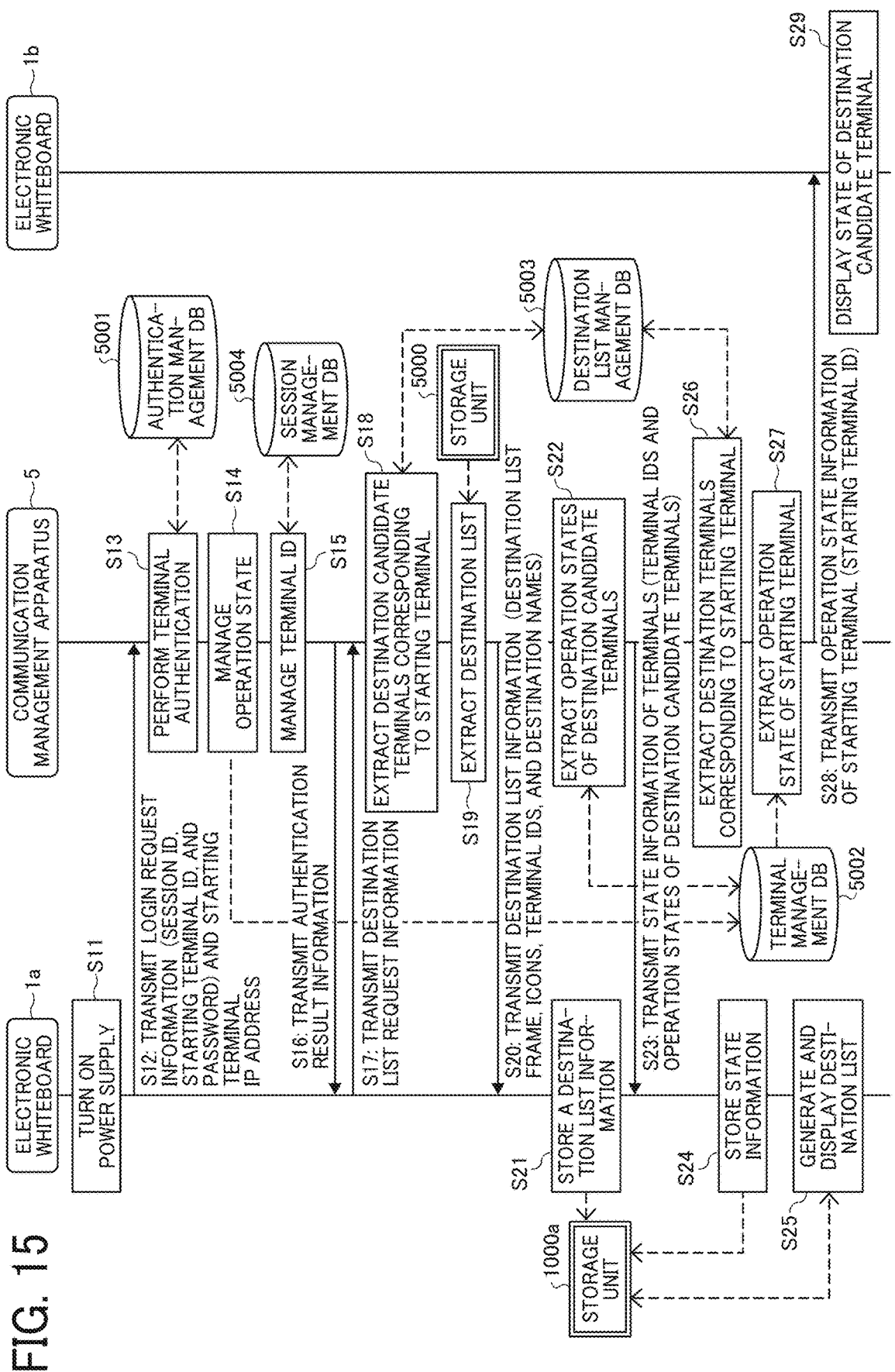
FIG. 15 is a sequence diagram illustrating an example of a preparatory process to start remote communication between electronic whiteboards of the embodiment.

FIG. 15 is a sequence diagram illustrating an example of a preparatory process for starting remote communication between the electronic whiteboards 1. FIG. 16 is a diagram illustrating an example of a destination list screen displayed on one of the electronic whiteboards 1.

When the power switch 122 of the electronic whiteboard 1a is turned on, the receiving unit 12a receives the power-on operation (step S11).

The communication unit 11a of the electronic whiteboard 1a then transmits the login request information to the communication management apparatus 5 via the communication network 100 (step S12). The login request information, which represents the request for login authentication, includes the terminal ID of the electronic whiteboard 1a and the password. The terminal ID and the password are data read from the storage unit 1000a and transmitted to the communication unit 11a by the storing and reading unit 19a. The terminal ID and the password transmitted to the communication unit 11a are not necessarily read from the storage unit 1000a, and may be input by the user with an input device such as a keyboard, or may be read from a recording medium connected to the electronic whiteboard 1a, such as a subscriber identify module (SIM) card or an SD card. Then, the communication unit 51 of the communication management apparatus 5 receives the login request information transmitted from the electronic whiteboard 1a.

Then, the authentication unit 52 of the communication management apparatus 5 performs a search through the authentication management table (see FIG. 9) with search keys set to the terminal ID and the password included in the login request information received via the communication unit 51. If the same terminal ID and password as those included in the login request information are managed in the authentication management table, the authentication unit 52 allows login of the electronic whiteboard 1a (step S13), and the processes of step S14 and the subsequent steps are executed.

If the login of the electronic whiteboard 1a is allowed, the terminal managing unit 54 updates the information of the terminal management table (see FIG. 10), specifically the information corresponding to the terminal ID "01aa" of the electronic whiteboard 1a. For example, the terminal managing unit 54 changes the information of the operation state corresponding to the terminal ID "01aa" to "ON-LINE (COMMUNICATION AVAILABLE)." and updates the information of the reception time to the date and time of receipt of the login request information (step S14). The information of the terminal IP address in the terminal management table may be transmitted from the electronic whiteboard 1a at step S12 instead of being previously registered therein. Thereby, the operation state "ON-LINE (COMMUNICATION AVAILABLE)." the reception time "2020.2.10.13:40 (13:40 on Feb. 10, 2020)," and the terminal IP address "1.2.1.3" are managed in the terminal management table in association with the terminal ID "01aa," as illustrated in FIG. 10, for example.

Then, the session managing unit 55 adds a new record to the session management table (see FIG. 12) and manages the new record (step S15). In the new record, the terminal ID "01aa" of the electronic whiteboard 1a received at step S12 is managed as the starting terminal ID. Then, the communication unit 51 transmits authentication result information to the electronic whiteboard 1a (i.e., the source of the login request information) via the communication network 100 (step S16). The authentication result information represents an authentication result obtained through the process of step S13.

In response to receipt of the authentication result information indicating that the login of the electronic whiteboard 1a is allowed, the communication unit 11a of the electronic whiteboard 1a (i.e., the login requesting terminal) transmits destination list request information to the communication management apparatus 5 via the communication network 100 (step S17). The destination list request information represents the request for the destination list. Then, the communication unit 51 of the communication management apparatus 5 receives the destination list request information.

Then, the terminal managing unit 54 performs a search through the destination list management table (see FIG. 11) with a search key set to the terminal ID "01aa" of the electronic whiteboard 1a (i.e., the login requesting terminal), to thereby read from the destination list management table the terminal IDs of the destination candidate terminals that are capable of communicating with the electronic whiteboard 1a. The terminal managing unit 54 further reads, from the terminal management table (see FIG. 10), the destination names corresponding to the terminal IDs of the destination candidate terminals (step S18). In the present example, the terminal managing unit 54 extracts the terminal IDs of the destination candidate terminals corresponding to the terminal ID "01aa" of the electronic whiteboard 1a and the destination names corresponding to the terminal IDs.

Then, the communication unit 51 reads, via the storing and reading unit 59, data such as the data of a destination list frame and the data of icons representing operation states from the storage unit 5000, for example (step S19). The communication unit 51 further transmits the destination list information to the electronic whiteboard 1a (step S20). The destination list information includes the read destination list frame and icons and the terminal IDs and the destination names extracted at step S18. That is, the destination list information includes the destination list frame, the icons, the terminal IDs, and the destination names. Then, in the electronic whiteboard 1a, the communication unit 11a receives the destination list information, and the storing and reading unit 19a stores the received destination list information in the storage unit 1000a (step S21).

In the present embodiment, the communication management apparatus 5 thus centrally manages the destination list information of all electronic whiteboards 1, instead of each of the electronic whiteboards 1 managing the destination list information. In the communication system 10 of the present embodiment, therefore, the communication management apparatus 5 centrally responds to changes such as the addition of a new electronic whiteboard 1 to the communication system 10, the replacement of any of the electronic whiteboards 1 in the communication system 10 with a new electronic whiteboard 1, and a change in the appearance of the destination list frame. Consequently, the electronic whiteboards 1 are saved from a process of changing the destination list information.

The terminal managing unit 54 further performs a search through the terminal management table (see FIG. 10) with search keys set to the terminal IDs of the destination candidate terminals extracted at step S18, to thereby read from the terminal management table the respective operation states corresponding to the terminal IDs of the destination candidate terminals. Thereby, the terminal managing unit 54 acquires the respective operation states of the electronic whiteboards 1 corresponding to the terminal IDs of the destination candidate terminals (step S22).

The communication unit 51 then transmits terminal state information to the electronic whiteboard 1a via the communication network 100 (step S23). The terminal state information includes the terminal IDs used as the search keys at step S22 and the respective operation states of the destination candidate terminals corresponding to the terminal IDs.

Then, the storing and reading unit 19a of the electronic whiteboard 1a sequentially stores, in the storage unit 1000a, the items of the terminal state information received from the communication management apparatus 5 (step S24). The electronic whiteboard 1a thereby receives the terminal state information of the electronic whiteboards 1 as the destination candidate terminals, and thus acquires the current operation states of the destination candidate terminals, i.e., the other electronic whiteboards 1 such as the electronic whiteboard 1b capable of communicating with the electronic whiteboard 1a.

Then, based on the destination list information and the terminal state information stored in the storage unit 1000a, the display control unit 14a generates the destination list reflecting the states of the destination candidate terminals. Further, with the generated destination list, the display control unit 14a controls the display 180 of the electronic whiteboard 1a to display a destination list screen 800 as illustrated in FIG. 16 (step S25). The destination list screen 800 displays, for each of the destination candidate terminals, the icon representing the operation state of the destination candidate terminal and the terminal ID and the destination name of the destination candidate terminal. In the example of FIG. 16, the icon representing the operation state of the destination candidate terminal is displayed as an "OFF-LINE" icon in the first row of the destination list screen 800 and as an "ON-LINE (COMMUNICATION AVAILABLE)" icon in the second row and a lower row of the destination list screen 800.

In the communication management apparatus 5, the terminal managing unit 54 performs a search through the destination list management table (see FIG. 11) based on the terminal ID "01aa" of the electronic whiteboard 1a, to thereby extract from the destination list management table the terminal IDs of the other electronic whiteboards 1 in which the electronic whiteboard 1a is registered as a destination candidate terminal (step S26). In the destination list management table in FIG. 11, terminal IDs "01ba," "01ca," and "01da" are among the terminal IDs of the other electronic whiteboards 1 read in this step.

The terminal managing unit 54 then performs a search through the terminal management table (see FIG. 10) based on the terminal ID "01aa" of the electronic whiteboard 1a, to thereby acquire the operation state of the electronic whiteboard 1a from the terminal management table (step S27).

Then, the communication unit 51 transmits terminal state information to the electronic whiteboards 1 corresponding to the terminal IDs extracted at step S26 and corresponding to the operation state "ON-LINE" in the terminal management table (see FIG. 10) (step S28). The terminal state information in this case includes the terminal ID "01aa" of the electronic whiteboard 1a and the operation state "ON-LINE" of the electronic whiteboard 1a acquired at step S27. When transmitting the terminal state information to the other electronic whiteboards 1 such as the electronic whiteboard 1b, the communication unit 51 refers to the IP addresses of the electronic whiteboards 1 managed in the terminal management table (see FIG. 10) based on the terminal IDs of the electronic whiteboards 1. Thereby, the communication unit 51 transmits the terminal ID "01aa" and the operation state "ON-LINE" of the electronic whiteboard 1a to each of the other electronic whiteboards 1 capable of communicating with the electronic whiteboard 1a, which is a destination candidate terminal for the other electronic whiteboards 1. Consequently, each of the destination candidate terminals (i.e., the other electronic whiteboards 1 such as the electronic whiteboard 1b) also displays, on the display 180 thereof, the state of the electronic whiteboard 1a (i.e., a destination candidate terminal for the other electronic whiteboards 1 such as the electronic whiteboard 1b) (step S29).

Process of Starting Remote Communication

Figure 17:
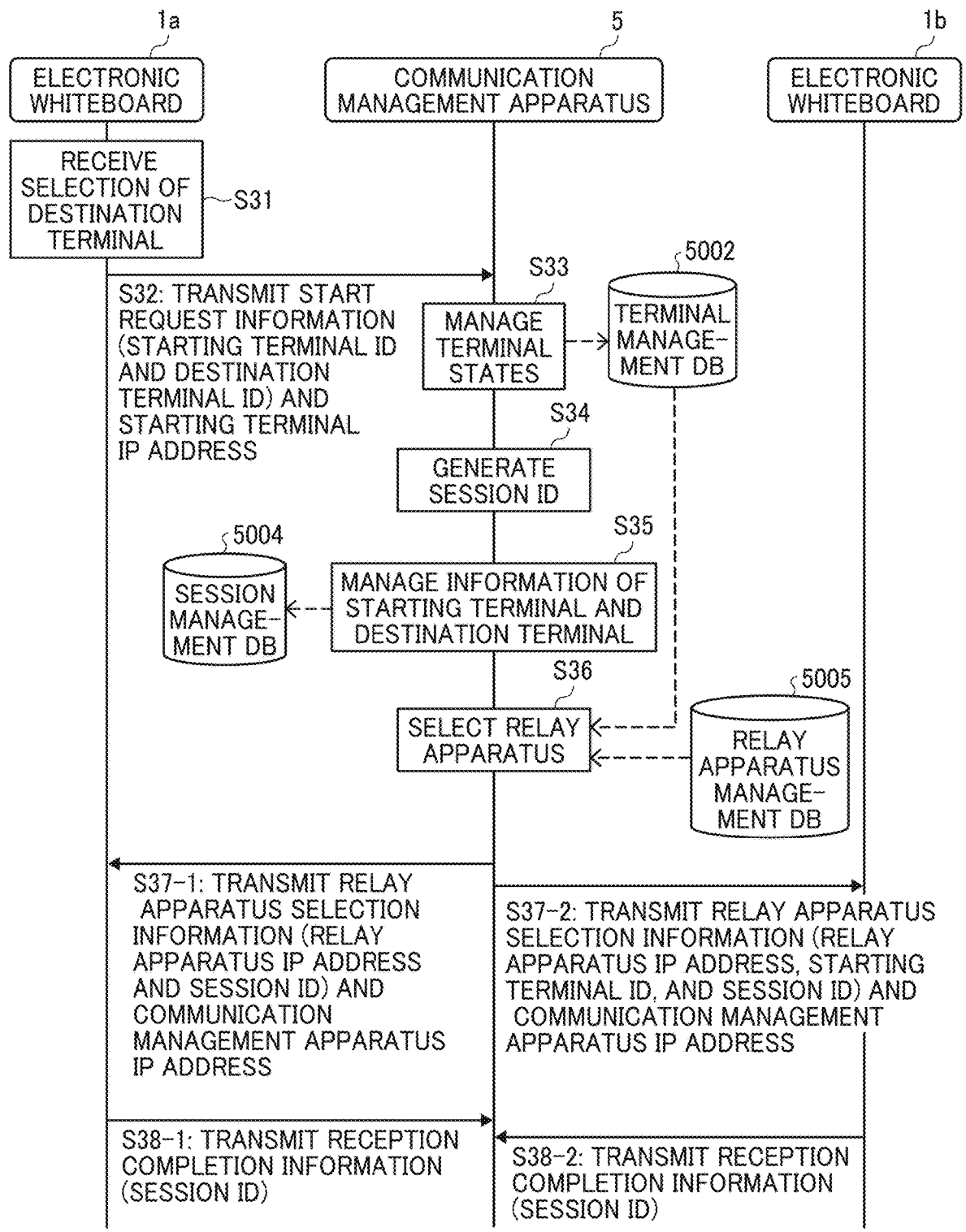
FIG. 17 is a sequence diagram illustrating an example of a remote communication start process of the embodiment.

With reference to FIG. 17, a description will be given of a process in which the electronic whiteboard 1a starts remote communication with the electronic whiteboard 1b.

FIG. 17 is a sequence diagram illustrating an example of a process of starting remote communication. When the user UA1 of the electronic whiteboard 1a (i.e., the starting terminal) selects the electronic whiteboard 1b (i.e., the destination terminal) by pressing a field in the destination list screen 800 of FIG. 16 corresponding to the terminal ID "01ba" of the electronic whiteboard 1b, the receiving unit 12a receives the user request to start the communication with the electronic whiteboard 1b (i.e., the destination terminal) (step S31). Then, the communication unit 11a of the electronic whiteboard 1a (i.e., the starting terminal) transmits the start request information to the communication management apparatus 5 (step S32). The start request information, which represents the request to start the communication, includes the terminal ID "01aa" of the electronic whiteboard 1a (i.e., the starting terminal) and the terminal ID "01ba" of the electronic whiteboard 1b (i.e., the destination terminal). Then, the communication unit 51 of the communication management apparatus 5 receives the start request information and the IP address of the electronic whiteboard 1a (i.e., the starting terminal) as the source of the start request information.

Then, the terminal managing unit 54 updates the terminal management table (see FIG. 10) based on the terminal ID "01aa" of the electronic whiteboard 1a (i.e., the starting terminal) and the terminal ID "01ba" of the electronic whiteboard 1b (i.e., the destination terminal) included in the start request information (step S33). For example, based on the terminal ID "01aa" of the electronic whiteboard 1a (i.e., the starting terminal) and the terminal ID "01ba" of the electronic whiteboard 1b (i.e., the destination terminal) included in the start request information, the terminal managing unit 54 updates the respective operation states corresponding to the terminal IDs "01aa" and "01ba" in the terminal management table to "ON-LINE (COMMUNI- CATING)." The information of the electronic whiteboard 1*a* (i.e., the starting terminal) and the electronic whiteboard 1*b* (i.e., the destination terminal) managed in the terminal management table in this state indicates that the electronic whiteboards 1*a* and 1*b* have not participated in a session yet but are in a communicating state. That is, the electronic whiteboard 1*a* (i.e., the starting terminal) and the electronic whiteboard 1*b* (i.e., the destination terminal) have not started a video conference yet, but are in the communicating state. Therefore, if a user of another electronic whiteboard 1 (e.g., a user of another electronic whiteboard 1 intending to join the communication) attempts to communicate with the electronic whiteboard 1*a* (i.e., the starting terminal) or the electronic whiteboard 1*b* (i.e., the destination terminal) in this state, the another electronic whiteboard 1 outputs a notification sound or displays a message to notify the user that the electronic whiteboard 1*a* or 1*b* is in the communicating state.

A description will be given of a process of executing a session to select the relay apparatus 3 to be used.

The session managing unit 55 of the communication management apparatus 5 first generates the session ID for identifying the session to be held between the electronic whiteboards 1*a* and 1*b* (step S34). It is assumed here that the session ID "se01" is generated.

The session managing unit 55 then stores and manages the session ID "se01" generated at step S34, the terminal ID "01aa" of the electronic whiteboard 1*a* (i.e., the starting terminal), and the terminal ID "01ba" of the electronic whiteboard 1*b* (i.e., the destination terminal) in the session management table (see FIG. 12) in association with each other (step S35).

Then, the relay apparatus managing unit 56 selects the relay apparatus 3 that relays the session between the electronic whiteboard 1*a* (i.e., the starting terminal) and the electronic whiteboard 1*b* (i.e., the destination terminal) (step S36). For example, the relay apparatus managing unit 56 selects, from the relay apparatuses 3 with relay apparatus IDs corresponding to the operation state "ON-LINE" in the relay apparatus management table (see FIG. 13), the relay apparatus 3 having an IP address close to the IP address of the electronic whiteboard 1*a* (i.e., the starting terminal) in the terminal management table (see FIG. 10). It is assumed in the following description that the relay apparatus 3 with the relay apparatus ID "111a" has been selected.

After the completion of the process of step S36 to select the relay apparatus 3, the communication unit 51 of the communication management apparatus 5 transmits relay apparatus selection information to the electronic whiteboard 1*a* (i.e., the starting terminal) (step S37-1). The relay apparatus selection information includes the IP address of the relay apparatus 3 selected at step S36 and the session ID "se01" generated at step S34. Then, the electronic whiteboard 1*a* (i.e., the starting terminal) acquires the IP address of the communication management apparatus 5 as the source of the relay apparatus selection information.

The communication unit 51 of the communication management apparatus 5 further transmits relay apparatus selection information to the electronic whiteboard 1*b* (i.e., the destination terminal) (step S37-2). The relay apparatus selection information includes the IP address of the relay apparatus 3 selected at step S36, the terminal ID "01aa" of the electronic whiteboard 1*a* (i.e., the starting terminal), and the session ID "se01" generated at step S34. In the execution of the session with the session ID "se01," therefore, the electronic whiteboard 1*b* (i.e., the destination terminal) acquires the IP address of the communication management apparatus 5 as the source of the relay apparatus selection information.

Then, the communication unit 11*a* of the electronic whiteboard 1*a* (i.e., the starting terminal) transmits reception completion information to the communication management apparatus 5 (step S38-1). The reception completion information indicates that the relay apparatus selection information transmitted in the process of step S37-1 has been received. The reception completion information includes the session ID transmitted in the process of step S37-1. Then, the communication management apparatus 5 acquires a message that the transmission of the relay apparatus selection information executed in a particular session with the session ID "se01" has been completed.

The electronic whiteboard 1*b* (i.e., the destination terminal) similarly transmits, to the communication management apparatus 5, reception completion information indicating that the relay apparatus selection information transmitted in the process of step S37-2 has been received (step S38-2). In this case, too, the communication management apparatus 5 acquires a message that the transmission of the relay apparatus selection information executed in the particular session with the session ID "se01" has been completed.

As described above, the electronic whiteboards 1*a* and 1*b* transmit and receive the site image data and the audio data to and from each other via the relay apparatus 3 selected at step S36, to thereby have the video conference.

Process of Sharing Data between Electronic Whiteboards

A process of sharing data between the electronic whiteboards 1 will be described with FIGS. 18 to 22D.

Figure 18:
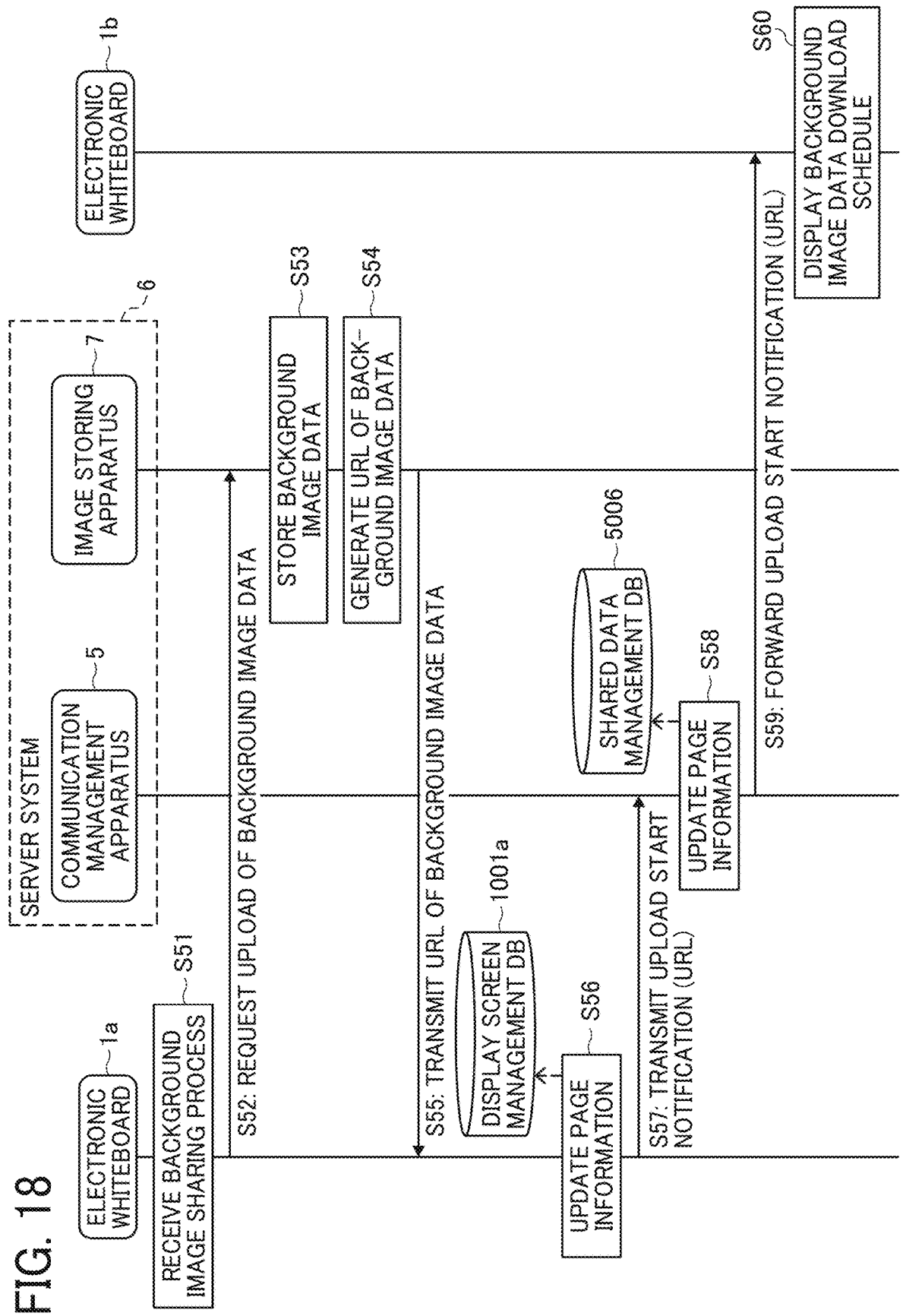
FIGS. 18, 19, and 20 are sequence diagrams illustrating an example of a data sharing process between the electronic whiteboards in the communication system of the embodiment.
Figure 19:
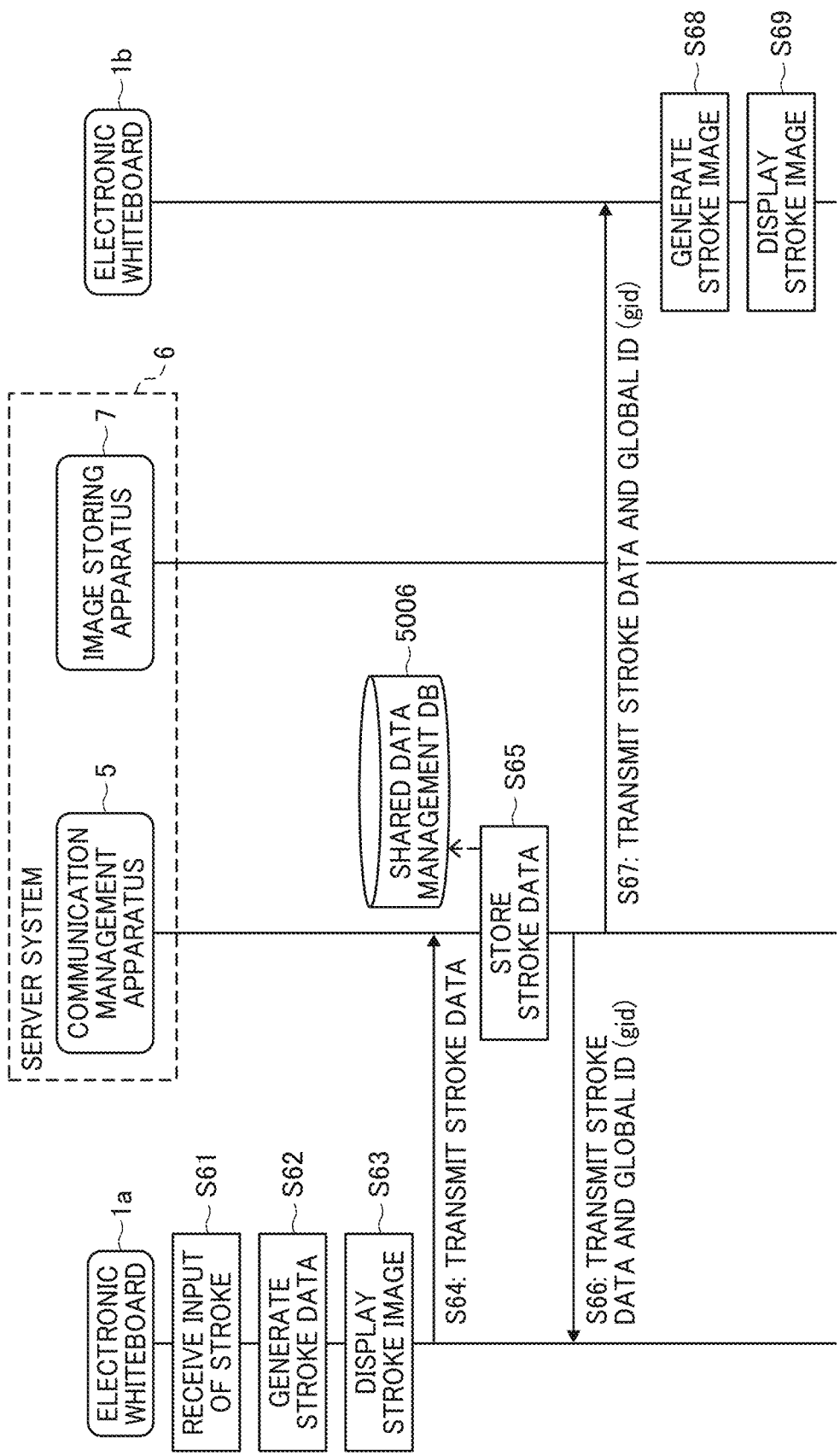
Figure 20:
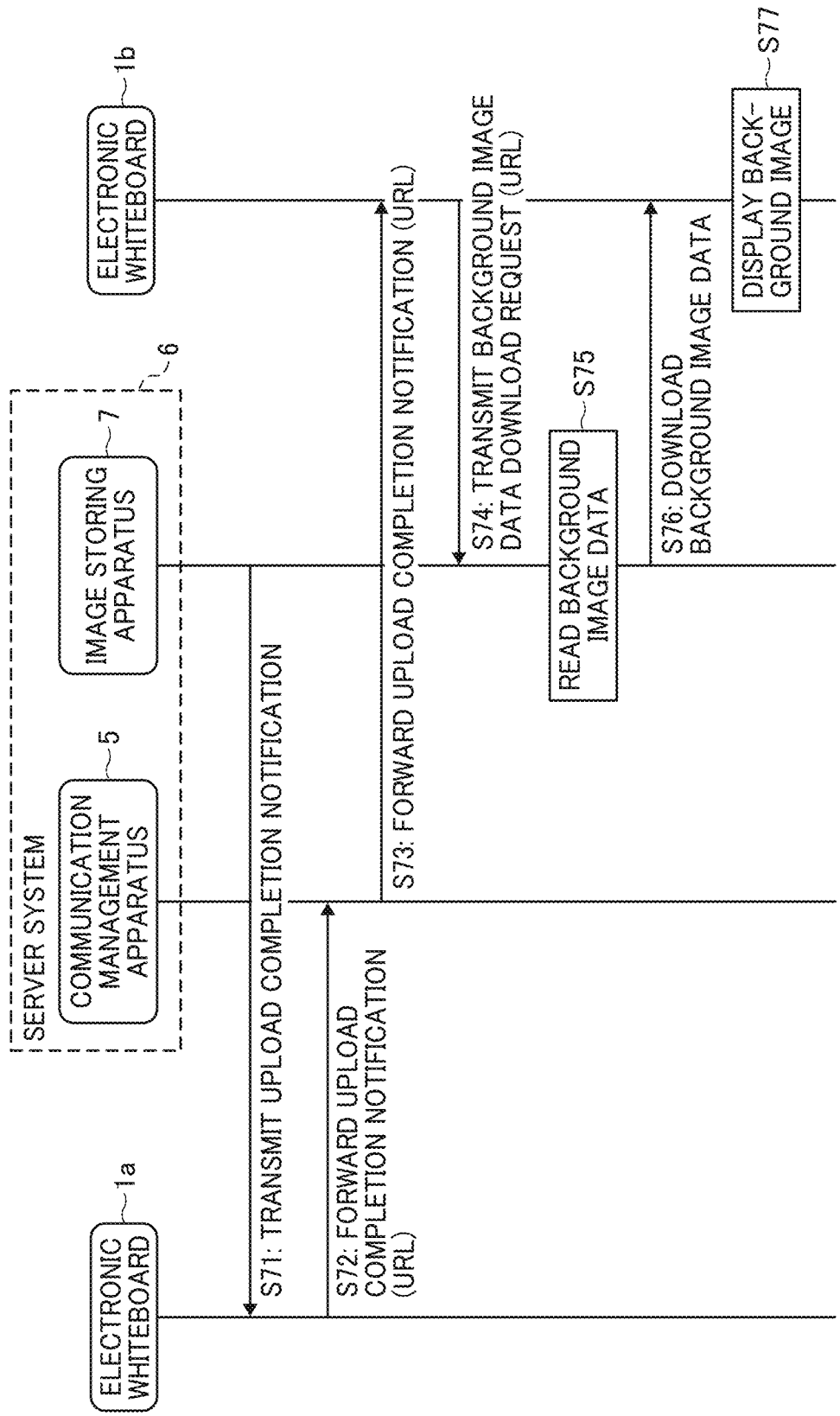

FIGS. 18 to 20 are sequence diagrams illustrating an example of the process of sharing data between the electronic whiteboards 1 in the communication system 10 of the embodiment.

The following description will be given of an example in which the electronic whiteboards 1*a* and 1*b* share the background image data and the stroke data such that the background image displayed on the electronic whiteboard 1*a* and the stroke image input to the electronic whiteboard 1*a* are also displayed on the electronic whiteboard 1*b*.

Figure 21A:
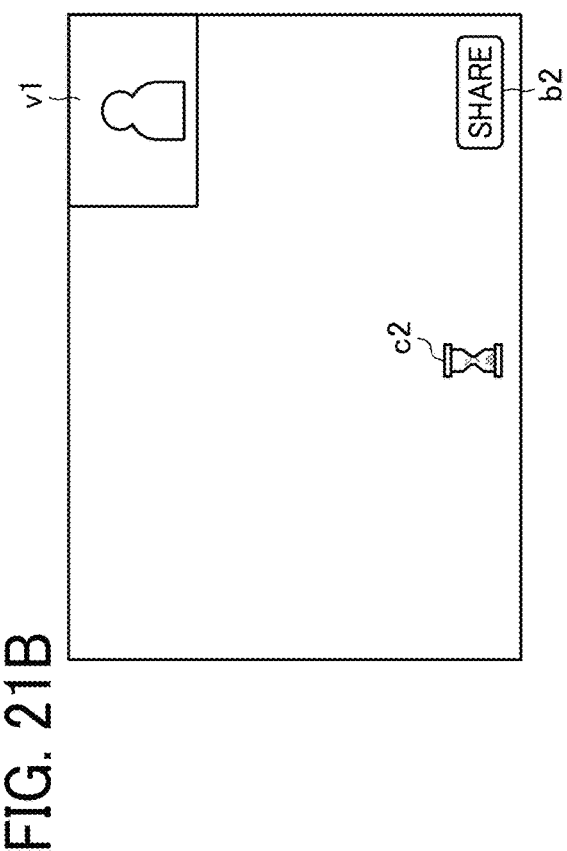
FIG. 21A is a diagram illustrating an example of a screen displayed on one of the electronic whiteboards of the embodiment.
Figure 21B:
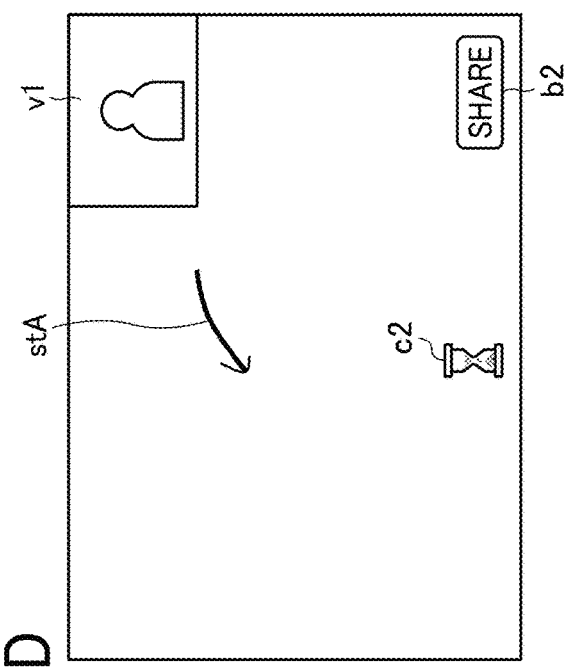
FIG. 21B is a diagram illustrating an example of a screen displayed on the other electronic whiteboard of the embodiment.
Figure 21C:
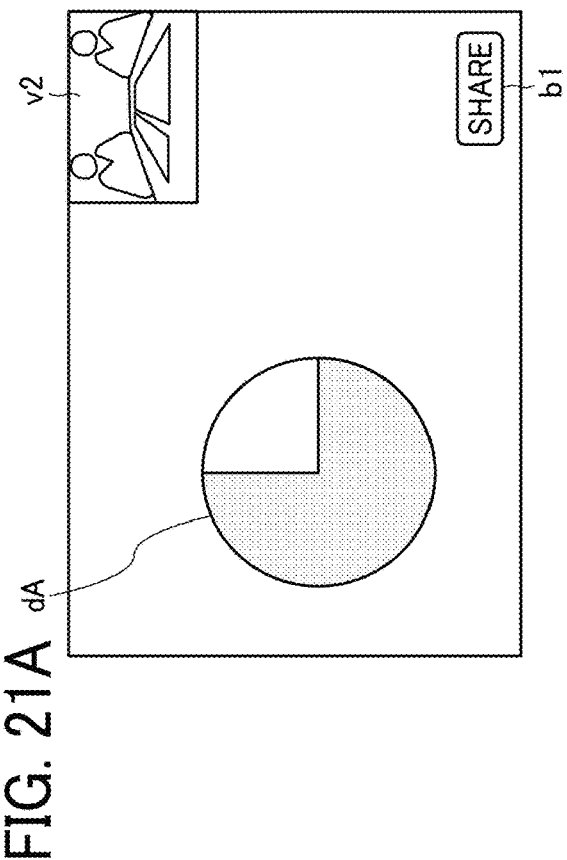
FIG. 21C is a diagram illustrating another example of the screen displayed on the one of the electronic whiteboards of the embodiment.
Figure 21D:
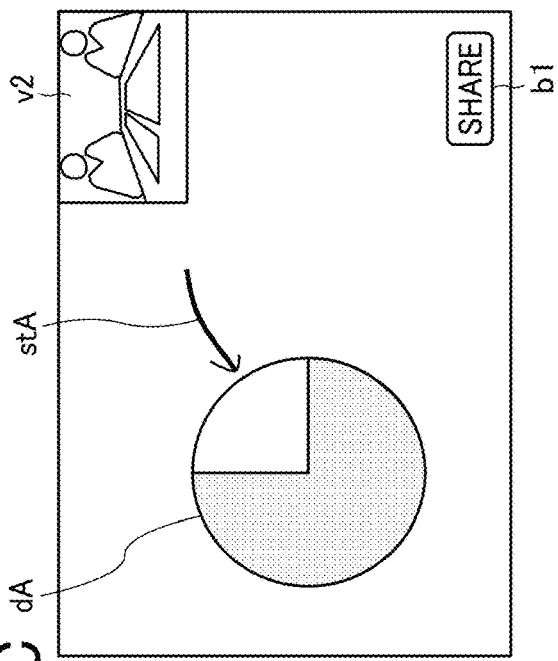
FIG. 21D is a diagram illustrating another example of the screen displayed on the other electronic whiteboard of the embodiment.

FIG. 21A is a diagram illustrating an example of a screen displayed on the electronic whiteboard 1*a*. FIG. 21B is a diagram illustrating an example of a screen displayed on the electronic whiteboard 1*b*. FIG. 21C is a diagram illustrating another example of the screen displayed on the electronic whiteboard 1*a*. FIG. 21D is a diagram illustrating another example of the screen displayed on the electronic whiteboard 1*b*.

In the electronic whiteboard 1*a* at the site A, the display control unit 14*a* controls the display 180 to display the screen illustrated in FIG. 21A. The screen of FIG. 21A displays a background image dA, an image v2 of the site B, and a share button b1 that is pressed to share the background image dA. If the user UA1 of the electronic whiteboard 1*a* presses the share button b1 in this state, the receiving unit 12*a* receives a background image sharing process requested by the user UA1 (step S51). Then, the communication unit 11*a* transmits an upload request to the image storing apparatus 7 to request upload of the image data of the background image dA (hereinafter referred to as the background image data) (step S52). In this case, the communication unit 11*a* transmits the background image data to a predetermined URL for uploading data (e.g., http://qwe.jp/upload) Then, the communication unit 71 of the image storing apparatus 7 receives the upload request transmitted from the electronic whiteboard 1*a*.

The storing and reading unit 79 of the image storing apparatus 7 stores the background image data received at step S52 in the storage unit 7000 (step S53). Then, the generation unit 73 of the image storing apparatus 7 generates a URL representing the storage location of the stored background image data (step S54). The URL is an example of storage location information. The storage location information also includes a uniform resource identifier (URI). The execution order of steps S53 and S54 may be reversed. Further, steps S53 and S54 may be executed in parallel. Thereby, the electronic whiteboard 1a is able to start uploading the background image data.

The communication unit 71 of the image storing apparatus 7 then transmits, to the electronic whiteboard 1a, the URL of the background image data generated by the generation unit 73 (step S55). Then, the communication unit 11a of the electronic whiteboard 1a receives the URL of the background image data transmitted from the image storing apparatus 7.

Then, the display screen managing unit 21a of the electronic whiteboard 1a updates the page information stored in the display screen management DB 1001a (step S56). In this case, the display screen managing unit 21a stores the page data (e.g., Page P1) corresponding to the background image data to be uploaded to the image storing apparatus 7.

Then, the communication unit 11a transmits an upload start notification to the communication management apparatus 5 to notify that the upload of the background image data has started (step S57). The upload start notification includes the page ID of the page corresponding to the background image data to be uploaded and the URL received at step S55. Then, the communication unit 51 of the communication management apparatus 5 receives the upload start notification transmitted from the electronic whiteboard 1a.

Based on the various information received at step S57, the shared data managing unit 57 of the communication management apparatus 5 updates the page information stored in the shared data management DB 5006 (see FIG. 14) (step S58). Specifically, the shared data managing unit 57 searches through the shared data management table for the information "body" associated with the page ID received at step S57, and describes the URL received at step S57 in the information "body." The shared data managing unit 57 further assigns a global ID (gid) to the page (i.e., page data) to be stored in the shared data management DB 5006.

The communication unit 51 of the communication management apparatus 5 forwards the upload start notification received at step S57 to the electronic whiteboard 1b, which is having the remote conference with the electronic whiteboard 1a (step S59). The communication unit 111b of the electronic whiteboard 1b then receives the upload start notification. Then, the display control unit 14b of the electronic whiteboard 1b controls the display 180 of the electronic whiteboard 1b to display the screen as illustrated in FIG. 21B (step S60). Before this step, the screen of FIG. 21B displays an image v1 of the site A and a share button b2 that is pressed to share data. In response to receipt of the upload start notification at step S59, the electronic whiteboard 1b outputs data for displaying an hourglass icon c2 that visualizes the passage of time taken to download the background image data.

The passage of time may be expressed by a still image of an hourglass or a moving image of an hourglass with moving sand. The hourglass icon c2 is an example of schedule information indicating that image data is scheduled to be downloaded. Other examples of the schedule information include an icon other than the hourglass icon (e.g., a clock icon), a character (and/or a symbol) replacing the icon, and a combination of an icon and a character (and/or a symbol). Further, the schedule information may be notified by sound. In this case, the schedule information is output as sound from the speaker 150 by the image and audio processing unit 13a, not by the display control unit 14a.

Then, as illustrated in FIG. 19, the user UA1 at the site A moves the electronic pen 190 or the hand H in contact with the display 180 of the electronic whiteboard 1a, and the receiving unit 12a receives the input of the stroke (i.e., trajectory) of the movement (step S61). Based on the input stroke, the image processing unit 16a then generates stroke data (e.g., the data of coordinates (x, y)) for displaying a stroke image on the two-dimensional display 180 (step S62). Then, the display control unit 14a controls the display 180 of the electronic whiteboard 1a to display the stroke image (step S63). Thereby, a stroke image stA is displayed, as illustrated in FIG. 21C.

Then, the communication unit 11a transmits, to the communication management apparatus 5, the stroke data generated at step S62 to reproduce the stroke image (step S64). Then, the communication unit 51 of the communication management apparatus 5 receives the stroke data transmitted from the electronic whiteboard 1a.

The shared data managing unit 57 of the communication management apparatus 5 then stores the stroke data received at step S64 in the shared data management DB 5006 (see FIG. 14) (step S65). In this case, the shared data managing unit 57 stores the items of the stroke data received by the communication unit 51 in the shared data management table sequentially (i.e., in the generation order of the items of the stroke data) in association with the meeting ID (i.e., the session ID) identifying the currently held remote conference, as illustrated in FIG. 14. The shared data managing unit 57 further assigns a global ID (gid) to the stroke data received at step S64.

Then, the communication unit 51 transmits the stroke data stored at step S65 and the global ID (gid) assigned by the shared data managing unit 57 to the electronic whiteboard 1a (step S66). Then, the electronic whiteboard 1a receives the stroke data and the global ID (gid) transmitted from the communication management apparatus 5. Thereby, the electronic whiteboard 1a is notified that the stroke data has been received, and is also notified of the assigned global ID (gid).

The communication unit 51 further transmits the stroke data and global ID (gid) to the electronic whiteboard 1b, with which the electronic whiteboard 1a is having the remote conference (step S67). Then, the communication unit 11b of the electronic whiteboard 1b receives the stroke data and the global ID (gid) transmitted from the communication management apparatus 5. The image processing unit 16b of the electronic whiteboard 1b then generates the stroke image based on the stroke data received by the communication unit 11b (step S68). Then, the display control unit 14b of the electronic whiteboard 1b controls the display 180 of the electronic whiteboard 1b to display the stroke image generated at step S68 (step S69). Thereby, the same stroke image stA as that displayed on the electronic whiteboard 1a (i.e., the counterpart electronic whiteboard 1 of the electronic whiteboard 1b) is displayed on the electronic whiteboard 1b, as illustrated in FIG. 21D. The communication system 10 thus enables the stroke image rendered on the electronic whiteboard 1a to be shared by the electronic whiteboard 1b.

Then, as illustrated in FIG. 20, the communication unit 71 of the image storing apparatus 7 transmits an upload completion notification to the electronic whiteboard 1a to notify that the upload of the background image data has been completed (step S71). The upload completion notification includes the URL representing the storage location of the uploaded background image data. Then, the communication unit 11a of the electronic whiteboard 1a receives the upload completion notification transmitted from the image storing apparatus 7.

The communication unit 11a of the electronic whiteboard 1a forwards the upload completion notification received at step S71 to the communication management apparatus 5 (step S72). Then, the communication unit 51 of the communication management apparatus 5 forwards the upload completion notification received at step S72 to the electronic whiteboard 1b (step S73). Then, the communication unit 11b of the electronic whiteboard 1b receives the upload completion notification transmitted from the communication management apparatus 5.

The communication unit 11b of the electronic whiteboard 1b transmits a download request to the image storing apparatus 7 to request download of the background image data from the URL received at step S73, i.e., the URL representing the storage location in the image storing apparatus 7 (step S74). Then, the communication unit 71 of the image storing apparatus 7 receives the download request transmitted from the electronic whiteboard 1b.

Then, based on the URL included in the download request received by the communication unit 71, the storing and reading unit 79 of the image storing apparatus 7 reads the requested background image data from the storage unit 7000 (step S75). The communication unit 71 then transmits the requested background image data to the electronic whiteboard 1b as the source of the download request. Then, the communication unit 11b of the electronic whiteboard 1b downloads (i.e., receives) the background image data (step S76). Then, the display control unit 14b of the electronic whiteboard 1b controls the display 180 of the electronic whiteboard 1b to display the background image based on the background image data downloaded (i.e., received) by the communication unit 11b (step S77). Specifically, the display control unit 14b displays, on the screen illustrated in FIG. 21D, the same background image dA as that illustrated in FIG. 21C, and stops displaying the hourglass icon c2.

Thereby, the electronic whiteboards 1a and 1b share the stroke image and the background image displayed on the display 180. The background image data of the background image displayed on one of the electronic whiteboards 1a and 1b (e.g., the electronic whiteboard 1a) is uploaded to the image storing apparatus 7 to be downloadable to the other one of the electronic whiteboards 1a and 1b (e.g., the electronic whiteboard 1b). Further, the stroke data of the stroke rendered on one of the electronic whiteboards 1a and 1b (e.g., the electronic whiteboard 1a) is shared by the other one of the electronic whiteboards 1a and 1b (e.g., the electronic whiteboard 1b) via the communication management apparatus 5. The electronic whiteboards 1a and 1b also share, via the communication management apparatus 5, the operation information (see FIG. 8) of the operation such as generating the rendering screen (i.e., the page) to be displayed on the electronic whiteboards 1a and 1b or changing the rendering screen (i.e., the page). The process of steps S51 to S60 to start uploading the background image data to the image storing apparatus 7 from the electronic whiteboard 1a and the stroke data sharing process of steps S61 to S69 may be reversed in order, or may be executed in parallel.

The rendering screen shared by the electronic whiteboards 1a and 1b will be described with FIGS. 22A, 22B, 22C, and 22D.

Figure 22A:
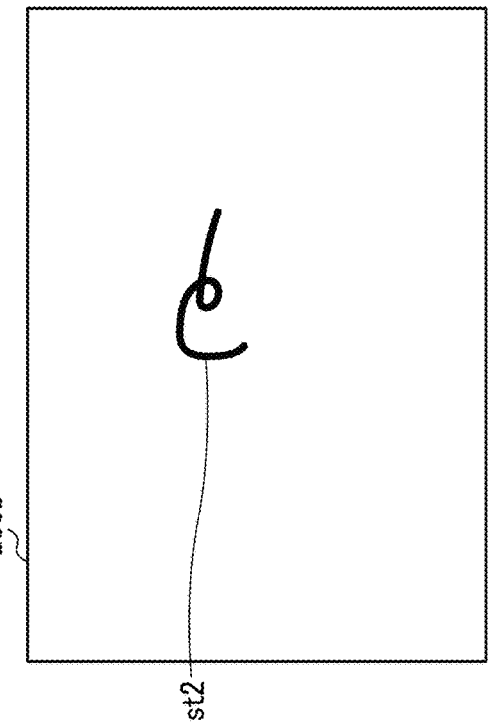
FIGS. 22A, 22B, 22C, and 22D are diagrams illustrating examples of a display screen shared by the electronic whiteboards of the embodiment.

A rendering screen 200a illustrated in FIG. 22A displays a background image dl and a stroke image st1. A rendering screen 200b illustrated in FIG. 22B displays a stroke image st2. A rendering screen 200c illustrated in FIG. 22C displays a background image d3 and a stroke image st3. A rendering screen 200d illustrated in FIG. 22D displays a background image d4 and a stroke image st4.

Figure 22B:
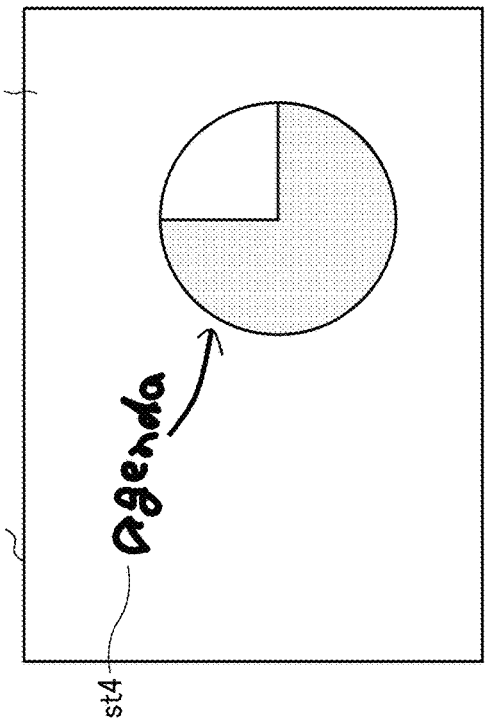
Figure 22C:
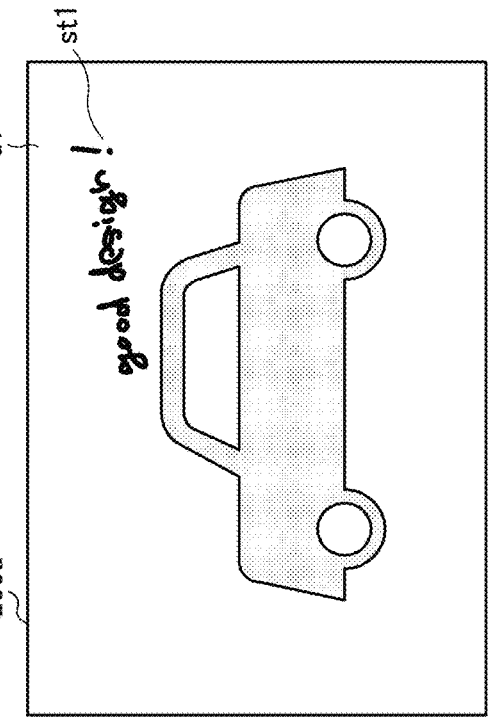
Figure 22D:
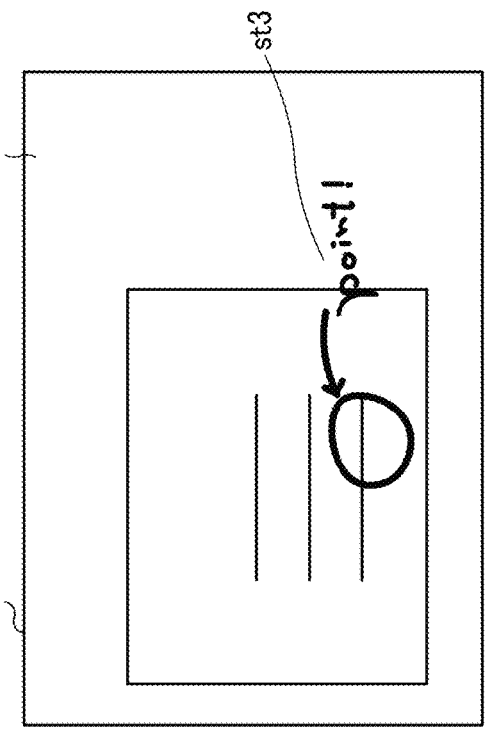

As described above, the electronic whiteboards 1a and 1b share a plurality of rendering screens such as those illustrated in FIGS. 22A to 22D. Further, the electronic whiteboards 1a and 1b manage, as rendering screen information (i.e., the display screen information) illustrated in FIG. 7, the screen data (i.e., the background image data and the stroke data) forming the rendering screen displayed on the display 180. For example, the rendering screen 200a illustrated in FIG. 22A is a rendering screen corresponding to the screen data of the page P1, and the rendering screen 200b illustrated in FIG. 22B is a rendering screen corresponding to the screen data of the page P2. Further, for example, the rendering screen 200c illustrated in FIG. 22C is a rendering screen corresponding to the screen data of the page P3, and the rendering screen 200d illustrated in FIG. 22D is a rendering screen corresponding to the screen data of the page P4. The rendering screens 200a to 200d illustrated in FIGS. 22A to 22D are examples of the display screen displayed on the display 180.

As described above, when the electronic whiteboard 1a transmits the background image data and then the stroke data of the stroke image, the stroke data reaches the counterpart electronic whiteboard 1b before the background image data reaches the electronic whiteboard 1b, since the data size of the stroke data is substantially smaller than that of the image data. In the present embodiment, therefore, when the electronic whiteboard 1a uploads the image data, the communication management apparatus 5 receives the upload start notification from the electronic whiteboard 1a, and forwards (i.e., transmits) the upload start notification to the electronic whiteboard 1b, as in step S59 in FIG. 18. Then, the electronic whiteboard 1b outputs the data for displaying the hourglass icon c2, as illustrated in FIG. 21B, to visually notify that the background image data is going to be downloaded, as in step S60 in FIG. 18. When the display of the stroke image is in progress, therefore, the users UB1 and UB2 of the electronic whiteboard 1b at the site B realize that there is an incoming background image (e.g., the image of a material) to be transmitted later. With this realization, the users UB1 and UB2 are able to smoothly communicate with the user UA1 of the electronic whiteboard 1a at the site A.

First Modified Example of Embodiment

A process of the communication system 10 according to a first modified example of the embodiment will be described with FIG. 23.

In the communication system 10 of the first modified example, the electronic whiteboard 1b starts downloading the background image data from the image storing apparatus 7 before the upload from the electronic whiteboard 1a is completed. FIG. 23 is a sequence diagram illustrating an example of a data sharing process between the electronic whiteboards 1 in the communication system 10 according to the first modified example of the embodiment. The process of starting the upload of the background image data to the image storing apparatus 7 from the electronic whiteboard 1a and the stroke data sharing process in the first modified example are similar to those illustrated in FIGS. 18 and 19, and thus description thereof will be omitted.

The communication unit 11b of the electronic whiteboard 1b transmits a download request to the image storing apparatus 7 to request download of the background image data from the URL transmitted from the communication management apparatus 5, i.e., the URL representing the storage location in the image storing apparatus 7 (step S91). Then, the communication unit 71 of the image storing apparatus 7 receives the download request transmitted from the electronic whiteboard 1b.

Then, based on the URL included in the download request received by the communication unit 71, the storing and reading unit 79 of the image storing apparatus 7 reads the requested background image data from the storage unit 7000 (step S92). The communication unit 71 then transmits the read background image data to the electronic whiteboard 1b as the source of the download request. Then, the communication unit 11b of the electronic whiteboard 1b starts downloading (i.e., receiving) the background image data (step S93).

In parallel with the transmission of the background image data to the electronic whiteboard 1b, the image storing apparatus 7 executes the process of uploading the background image data from the electronic whiteboard 1a (i.e., step S52 in FIG. 18) and the process of storing the background image data (i.e., step S53 in FIG. 18). After the background image data has been uploaded to the image storing apparatus 7, the communication unit 71 of the image storing apparatus 7 transmits the upload completion notification to the electronic whiteboard 1a to notify that the upload of the background image data has been completed (step S94).

The electronic whiteboard 1b continues to download the background image data from the image storing apparatus 7. If the download process by the electronic whiteboard 1b proceeds faster than the uploading process from the electronic whiteboard 1a, the image storing apparatus 7 causes the electronic whiteboard 1a to stand by, for example, and sequentially transmits the uploaded items of the background image data to the electronic whiteboard 1b. That is, the image storing apparatus 7 transmits the background image data as necessary from the storage unit 7000 to the electronic whiteboard 1b, while receiving the uploaded background image data from the electronic whiteboard 1a.

When the download of the background image data from the image storing apparatus 7 is completed (step S95), the display control unit 14b of the electronic whiteboard 1b controls the display 180 of the electronic whiteboard 1b to display the background image based on the downloaded (i.e., received) background image data (step S96).

As described above, the electronic whiteboard 1b at the site B is able to start downloading the background image data without waiting for the completion of the upload of the background image data from the electronic whiteboard 1a at the site A. Therefore, the time taken for the electronic whiteboard 1b to share the background image data is reduced as compared with a case in which the electronic whiteboard 1b starts downloading the background image data after the upload of the background image data is completed. Consequently, the communication system 10 of the first modified example further contributes to the smooth communication between the user UA1 of the electronic whiteboard 1a and the users UB1 and UB2 of the electronic whiteboard 1b.

Second Modified Example of Embodiment

A process of the communication system 10 according to a second modified example of the embodiment will be described with FIGS. 24 to 26. In the communication system 10 of the second modified example, the electronic whiteboard 1a starts uploading the background image data to the image storing apparatus 7 in response to receipt of the download request from another electronic whiteboard 1 (e.g., the electronic whiteboard 1b). That is, in the communication system 10 of the second modified example, the electronic whiteboard 1a does not upload the background image data to the image storing apparatus 7 unless the request to download the background image is transmitted to the electronic whiteboard 1a from the electronic whiteboard 1b.

Figure 24:
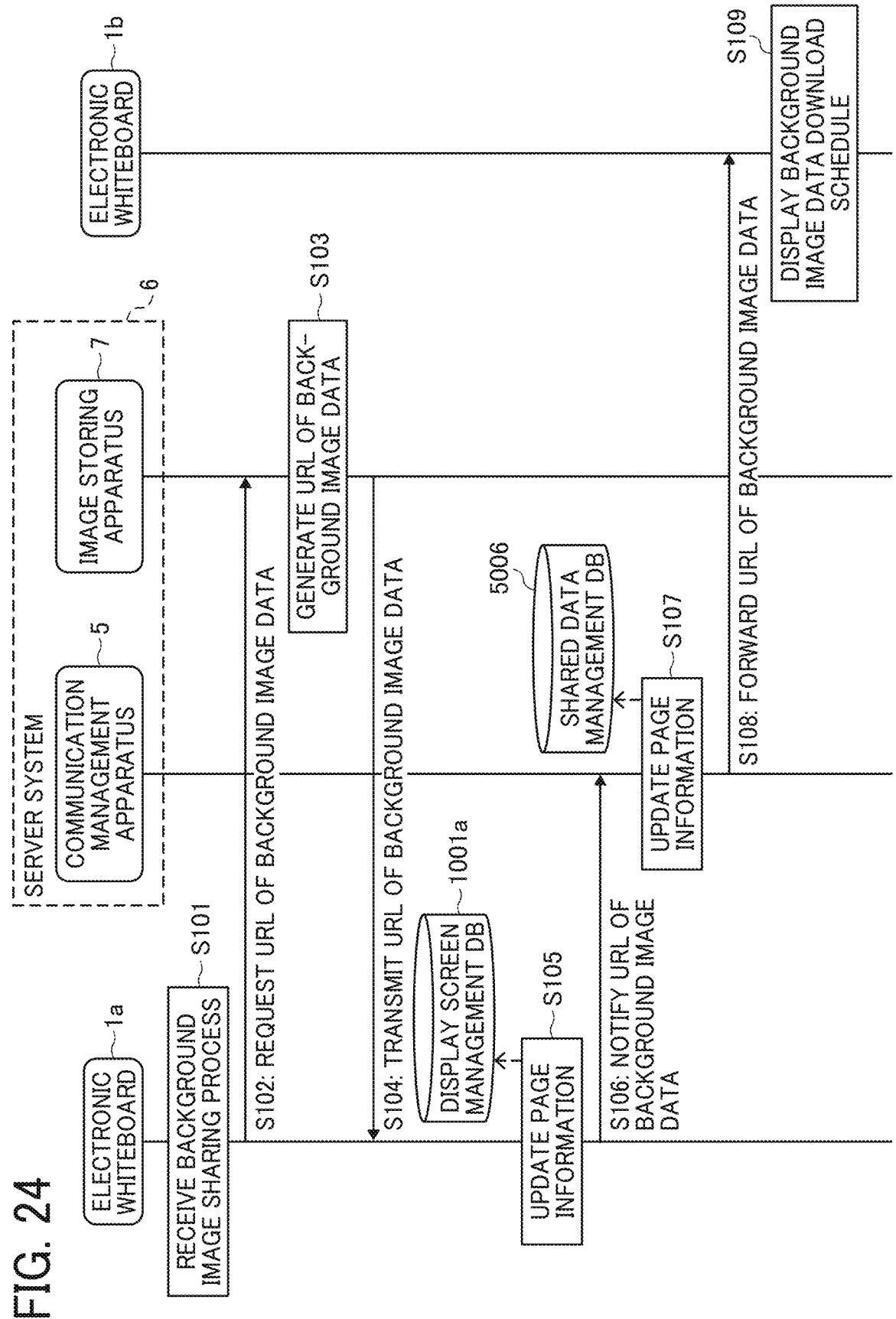
FIGS. 24, 25, and 26 are sequence diagrams illustrating an example of a data sharing process between the electronic whiteboards in the communication system according to a second modified example of the embodiment.
Figure 25:
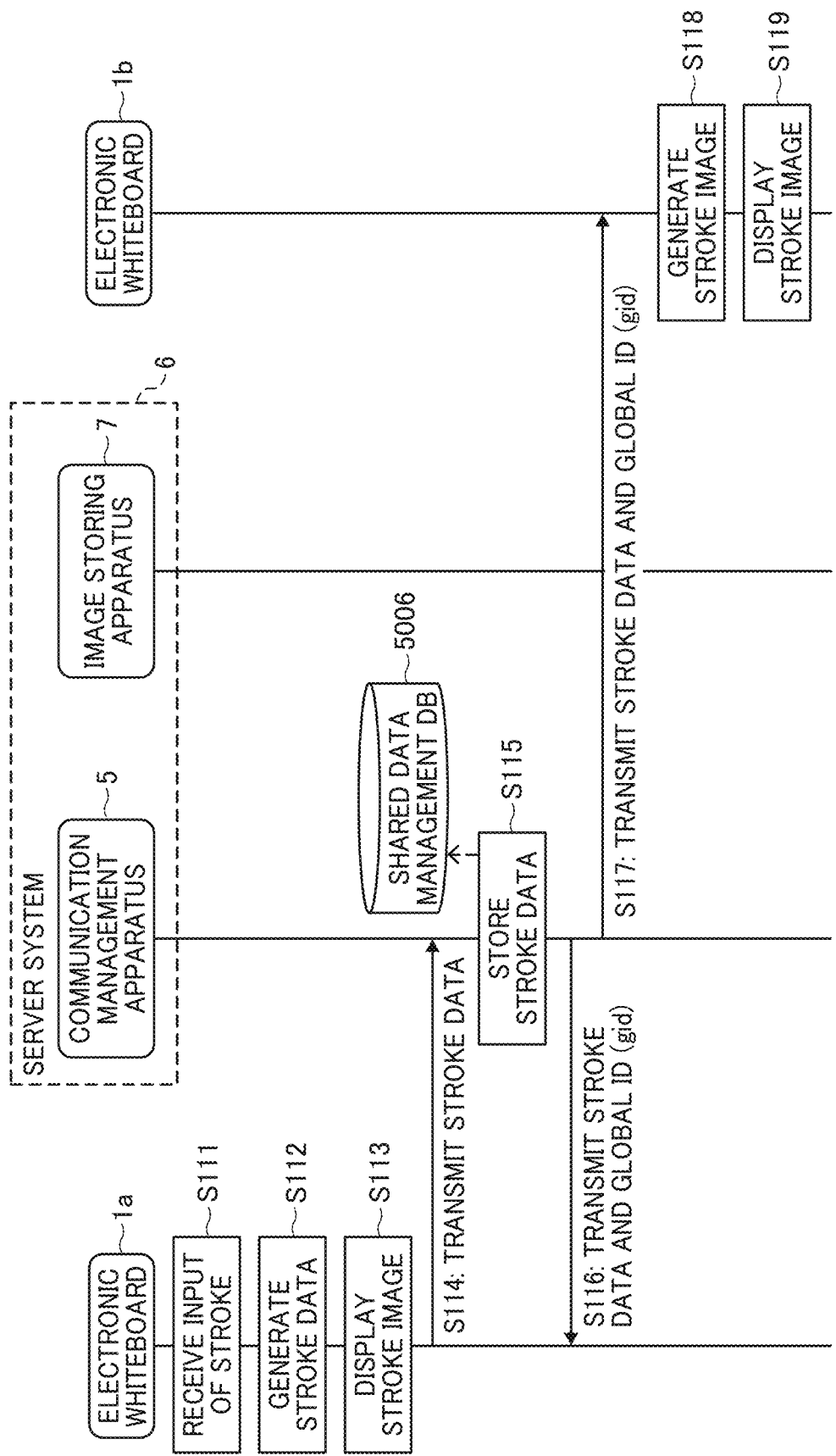
Figure 26:
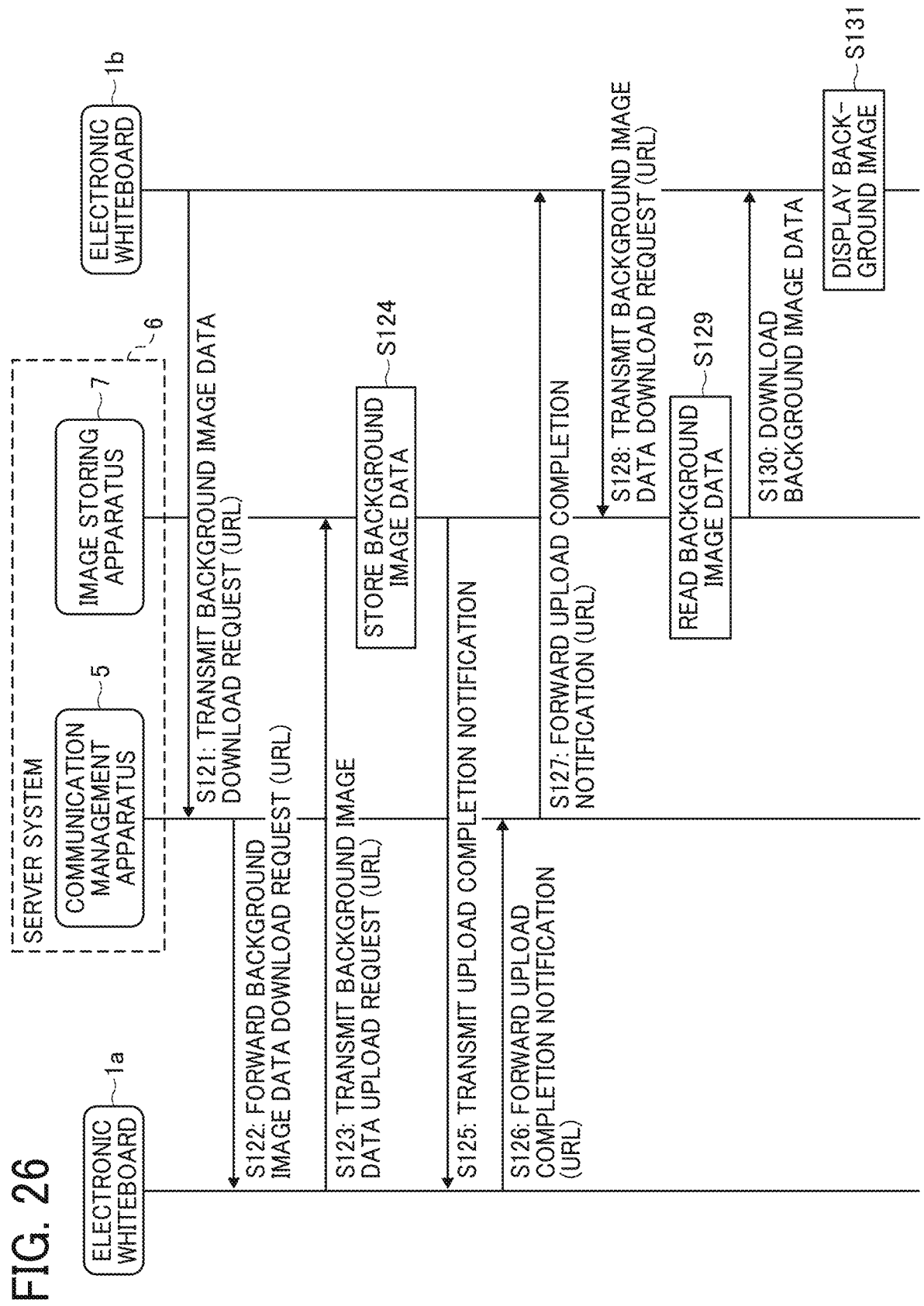

FIGS. 24 to 26 are sequence diagrams illustrating an example of a data sharing process between the electronic whiteboards 1 in the communication system 10 of the second modified example of the embodiment. The following description will be given of an example in which the image data of the background image and the stroke data of the stroke image are shared by the electronic whiteboards 1a and 1b such that the background image displayed on the electronic whiteboard 1a and the stroke image input to the electronic whiteboard 1a are also displayed on the electronic whiteboard 1b.

In the electronic whiteboard 1a at the site A, the display control unit 14a controls the displays 180 to display the screen illustrated in FIG. 21A. If the user UA1 of the electronic whiteboard 1a presses the share button b1 in this state, the receiving unit 12a receives the background image sharing process requested by the user UA1 (step S101). The communication unit 11a then transmits, to the image storing apparatus 7, request information that requests the URL representing the storage location of the background image data (step S102). Then, the communication unit 71 of the image storing apparatus 7 receives the request information transmitted from the electronic whiteboard 1a.

Then, the generation unit 73 of the image storing apparatus 7 generates the URL representing the storage location of the background image data (step S103). The communication unit 71 then transmits, to the electronic whiteboard 1a, the URL of the background image data generated by the generation unit 73 (step S104). Then, the communication unit 11a of the electronic whiteboard 1a receives the URL of the background image data.

Then, the display screen managing unit 21a of the electronic whiteboard 1a updates the page information stored in the display screen management DB 1001a (step S105). In this case, the display screen managing unit 21a stores the page data corresponding to the background image data to be uploaded to the image storing apparatus 7.

Then, the communication unit 11a transmits notification information to the communication management apparatus 5 to notify the communication management apparatus 5 of the URL of the background image data (step S106). The notification information includes the page ID of the page corresponding to the background image data to be uploaded and the URL received at step S104. Then, the communication unit 51 of the communication management apparatus 5 receives the notification information transmitted from the electronic whiteboard 1a.

Based on the various information received at step S106, the shared data managing unit 57 of the communication management apparatus 5 updates the page information stored in the shared data management DB 5006 (step S107).

Specifically, the shared data managing unit 57 searches through the shared data management table for the information "body" associated with the page ID received at step S106, and describes the URL received at step S106 in the information "body." The shared data managing unit 57 further assigns a global ID (gid) to the page (i.e., page data) to be stored in the shared data management DB 5006.

The communication unit 51 of the communication management apparatus 5 forwards the notification information received at step S106 to the electronic whiteboard 1b (step S108). Then, the communication unit 11b of the electronic whiteboard 1b receives the notification information transmitted from the communication management apparatus 5. The display control unit 14b of the electronic whiteboard 1b then controls the display 180 of the electronic whiteboard 1b to displays the screen as illustrated in FIG. 21B (step S109).

The stroke image sharing process of steps S111 to S119 in FIG. 25 is similar to that of steps S61 to S69 in FIG. 19, and thus description thereof will be omitted. Then, as illustrated in FIG. 26, in response to receipt of a certain operation performed on the electronic whiteboard 1b by the user UB1 or UB2, the communication unit 11b of the electronic whiteboard 1b transmits, to the communication management apparatus 5, a download request representing the request to download the background image data (step S121). The download request includes the URL representing the storage location of the background image data received at step S108. Then, the communication unit 51 of the communication management apparatus 5 forwards the download request received at step S121 to the electronic whiteboard 1a (step S122). Then, the communication unit 11a of the electronic whiteboard 1a receives the download request transmitted from the communication management apparatus 5.

The communication unit 11a of the electronic whiteboard 1a then transmits, to the image storing apparatus 7, an upload request representing the request to upload the background image data to the URL transmitted from the communication management apparatus 5, i.e., the URL representing the storage location in the image storing apparatus 7 (step S123). Then, the communication unit 71 of the image storing apparatus 7 receives the upload request transmitted from the electronic whiteboard 1a. The storing and reading unit 79 of the image storing apparatus 7 then stores the background image data received at step S123 in the storage unit 700 (step S124). Then, the electronic whiteboard 1a starts uploading the background image data to the URL. After the upload of the background image data is completed, the communication unit 71 of the image storing apparatus 7 transmits an upload completion notification to the electronic whiteboard 1a (step S125). The following processes of steps S126 to S131 in FIG. 26 are similar to those of steps S72 to S77 in FIG. 20, and thus description thereof will be omitted.

As described above, the electronic whiteboard 1a at the site A does not upload the background image data unless receiving the download request from the electronic whiteboard 1b at the site B. In the communication system 10 of the second modified example, therefore, the time of transmitting the background image data is adjusted based on the time of transmitting the download request from the user UB1 or UB2 at the site B in consideration of factors such as the progress of the remote conference and the band condition of the communication network 100, for example.

As described above, an electronic whiteboard of an embodiment of the present invention is the electronic whiteboard 1b (an example of a communication terminal) that shares data with the electronic whiteboard 1a (an example of another communication terminal). The electronic whiteboard 1b receives, from the communication management apparatus 5 that manages the data shared with the electronic whiteboard 1a, the URL (an example of storage location information) representing the storage location of the background image data transmitted from the electronic whiteboard 1a. The electronic whiteboard 1b then transmits the download request to the image storing apparatus 7 corresponding to the URL to request download of the background image data. The electronic whiteboard 1b then starts downloading the background image data from the image storing apparatus 7, and receives, from the communication management apparatus 5, the stroke data of the stroke image rendered on the electronic whiteboard 1a. Thereby, the electronic whiteboard 1b is capable of concurrently executing the sharing of the stroke image and the sharing of the background image with the electronic whiteboard 1a, contributing to the smooth communication between the users UB1 and UB2 of the electronic whiteboard 1b and the user UA1 of the electronic whiteboard 1a.

Further, in response to receipt of the URL (an example of the storage location information) transmitted from the electronic whiteboard 1a (an example of the another communication terminal), the electronic whiteboard 1b (an example of the communication terminal) of the embodiment may control the display 180 (an example of a display) to display the hourglass icon c2 (an example of schedule information) indicating that the background image data is scheduled to be downloaded. When the display of the stroke image is in progress, therefore, the users UB1 and UB2 of the electronic whiteboard 1b realize that there is an incoming background image (e.g., the image of a material) to be transmitted later. With this realization, the users UB1 and UB2 of the electronic whiteboard 1b are able to have smooth communication with the user UA1 of the electronic whiteboard 1a.

Further, in response to receipt of the URL (an example of the storage location information) transmitted from the electronic whiteboard 1a (an example of the another communication terminal), the electronic whiteboard 1b (an example of the communication terminal) of the embodiment may transmit the download request to the image storing apparatus 7 to request download of the background image data. Thereby, the electronic whiteboard 1b starts downloading the background image data without waiting for the completion of the upload of the background image data from the electronic whiteboard 1a, reducing the time taken for the electronic whiteboard 1b to share the background image data. Consequently, the electronic whiteboard 1b further contributes to the smooth communication between the users UB1 and UB2 of the electronic whiteboard 1b and the user UA1 of the electronic whiteboard 1a.

Further, the electronic whiteboard 1b (an example of the communication terminal) of the embodiment may receive, from the communication management apparatus 5, the completion notification notifying the completion of the upload of the background image data. Then, in response to receipt of the completion notification, the electronic whiteboard 1b may transmit the download request to the image storing apparatus 7 to request download of the background image data. By adjusting the time of transmitting the download request, therefore, the user UB1 or UB2 of the electronic whiteboard 1b is able to adjust the time of transmitting the background image data from the electronic whiteboard 1a.

A communication system of an embodiment of the present invention is the communication system 10 including the electronic whiteboard 1a (an example of a first communication terminal) and the electronic whiteboard 1b (an example of a second communication terminal) that shares data with the electronic whiteboard 1a. The electronic whiteboard 1a transmits the URL (an example of storage location information) representing the storage location of the background image data to the communication management apparatus 5 that manages the data shared with the electronic whiteboard 1b. Further, the electronic whiteboard 1b receives the URL from the communication management apparatus 5, and transmits the download request to the image storing apparatus 7 corresponding to the URL to request download of the background image data. Then, the electronic whiteboard 1b starts downloading the background image data from the image storing apparatus 7, and receives, from the communication management apparatus 5, the stroke data of the stroke image rendered on the electronic whiteboard 1a. Thereby, the communication system 10 of the embodiment enables the sharing of the stroke image and the sharing of the background image to be concurrently executed between the electronic whiteboards 1a and 1b. Consequently, the communication system 10 contributes to smooth communication between the users UB1 and UB2 of the electronic whiteboard 1b and the user UA1 of the electronic whiteboard 1a.

The communication system 10 of the embodiment may further include the image storing apparatus 7 that stores the background image data shared by the electronic whiteboard 1a (an example of the first communication terminal) and the electronic whiteboard 1b (an example of the second communication terminal). The electronic whiteboard 1a may receive the download request transmitted from the electronic whiteboard 1b. In response to receipt of the download request, the electronic whiteboard 1a may transmit the upload request to the image storing apparatus 7 corresponding to the URL (an example of the storage location information) representing the storage location of the background image data to request upload of the background image data. Further, the image storing apparatus 7 may receive the upload request transmitted from the electronic whiteboard 1a, generate the URL based on the received upload request, and transmit the generated URL to the electronic whiteboard 1a. Then, the electronic whiteboard 1a may transmit, to the communication management apparatus 5, the URL transmitted from the image storing apparatus 7. The communication system 10 of the embodiment, therefore, enables the user UB1 or UB2 of the electronic whiteboard 1b, which is going to download the background image data, to adjust the time of transmitting the background image data from the electronic whiteboard 1a.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The various tables of the embodiment described above may be generated as a result of machine learning. The mutually associated data items in each of the tables may be categorized by machine learning to obviate the need for the tables. Herein, machine learning refers to a technology for causing a computer to acquire learning ability similar to human learning ability. According to the technology, the computer autonomously generates, from previously learned data, algorithms for making decisions such as data identification, and makes predictions by applying the algorithms to new data. The learning method for machine learning may be any of supervised learning, unsupervised learning, semi-supervised learning, reinforcement learning, and deep learning, or may be a learning method combining two or more of these learning methods. The learning method for machine learning is not limited to a particular method.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. A communication terminal to share data with another communication terminal, the communication terminal comprising circuitry configured to
   receive, from a communication management apparatus that manages the data shared with the another communication terminal, storage location information representing a storage location of background image data transmitted from the another communication terminal,
   transmit a download request to an image storing apparatus corresponding to the storage location to request download of the background image data, and
   start downloading the background image data from the image storing apparatus and receive, from the communication management apparatus, stroke data of a stroke image rendered on the another communication terminal,
   wherein the circuitry controls a display to display the stroke image based on the received stroke data and a background image based on the downloaded background image data, and
   wherein in response to receipt of the storage location information, the circuitry controls the display to display schedule information indicating that the background image data is scheduled to be downloaded.

2. The communication terminal of claim 1, wherein the schedule information includes an icon that visualizes passage of time.

3. The communication terminal of claim 1, wherein in response to receipt of the storage location information, the circuitry transmits the download request to the image storing apparatus.

4. The communication terminal of claim 1, wherein the circuitry is further configured to:
   receive, from the communication management apparatus, a completion notification notifying completion of upload of the background image data, and
   transmit the download request to the image storing apparatus in response to receipt of the completion notification.

5. A communication system comprising:
   a first communication terminal; and
   a second communication terminal configured to share data with the first communication terminal,
   the first communication terminal including first circuitry configured to
   transmit, to a communication management apparatus that manages the data shared with the second communication terminal, storage location information representing a storage location of background image data, and
   the second communication terminal including second circuitry configured to receive the storage location information from the communication management apparatus, transmit a download request to an image storing apparatus corresponding to the storage location to request download of the background image data, and start downloading the background image data from the image storing apparatus and receive, from the communication management apparatus, stroke data of a stroke image rendered on the first communication terminal, wherein the first circuitry of the first communication terminal is further configured to receive the download request transmitted from the second communication terminal, and in response to receipt of the download request, transmit an upload request to the image storing apparatus corresponding to the storage location of the background image data to request upload of the background image data.

6. The communication system of claim 5, further comprising the image storing apparatus, the image storing apparatus including third circuitry configured to receive the upload request transmitted from the first communication terminal, in response to receipt of the upload request, generate the storage location information, and transmit the generated storage location information to the first communication terminal, wherein the first circuitry of the first communication terminal transmits, to the communication management apparatus, the storage location information transmitted from the image storing apparatus.

7. A communication method executed by a communication terminal that shares data with another communication terminal, the communication method comprising:

receiving, from a communication management apparatus that manages the data shared with the another communication terminal, storage location information representing a storage location of background image data transmitted from the another communication terminal;

transmitting a download request to an image storing apparatus corresponding to the storage position to request download of the background image data;

starting downloading the background image data from the image storing apparatus, and receiving, from the communication management apparatus, stroke data of a stoke image rendered on the another communication terminal;

controlling a display of the stroke image based on the received stroke data and a background image based on the downloaded background image data, and controlling, in response to receipt of the storage location information, the displaying to display schedule information indicating that the background image data is scheduled to be downloaded.

8. The method according to claim 7, wherein the schedule information includes an icon that visualizes passage of time.

9. The method of claim 7, wherein:

in response to receipt of the storage location information, the transmitting transmits the download request to the image storing apparatus.

10. The method of claim 7, further comprising:

receiving a completion notification notifying completion of upload of the background image data, and transmitting the download request to the image storing apparatus in response to receipt of the completion notification.

* * * * *